(12) United States Patent
Roumeas et al.

(10) Patent No.: US 11,236,119 B2
(45) Date of Patent: Feb. 1, 2022

(54) CHEMICALLY STABLE LIGNIN DERIVATIVE AND METHOD FOR PREPARING SAME

(71) Applicants: INSTITUT NATIONAL DE RECHERCHE POUR L'AGRICULTURE, L'ALIMENTATION ET L'ENVIRONNEMENT, Paris (FR); INSTITUT NATIONAL D'ENSEIGNEMENT SUPERIEUR POUR L'AGRICULTURE, L'ALIMENTATION ET L'ENVIRONNEMENT, Paris (FR)

(72) Inventors: Laurent Roumeas, Six-Fours-les Plages (FR); Guillaume Billerach, Montpellier (FR); Eric Dubreucq, Saint Gély du Fesc (FR); Hélène Fulcrand, Saint Gély du Fesc (FR)

(73) Assignees: INSTITUT NATIONAL DE RECHERCHE POUR L'AGRICULTURE, L'ALIMENTATION ET ENVIRONNEMENT, Paris (FR); INSTITUT NATIONAL D'ENSEIGNEMENT SUPERIEUR POUR L'AGRICULTURE, L'ALIMENTATION ET L'ENVIRONNEMENT, Paris (FR)

( * ) Notice: Subject to any disclaimer, the term of this patent is extended or adjusted under 35 U.S.C. 154(b) by 0 days.

(21) Appl. No.: 16/651,445

(22) PCT Filed: Sep. 28, 2018

(86) PCT No.: PCT/EP2018/076531
§ 371 (c)(1),
(2) Date: Mar. 27, 2020

(87) PCT Pub. No.: WO2019/063826
PCT Pub. Date: Apr. 4, 2019

(65) Prior Publication Data
US 2020/0299318 A1 Sep. 24, 2020

(30) Foreign Application Priority Data

Sep. 29, 2017 (FR) ........................... 1759134

(51) Int. Cl.
*C07G 1/00* (2011.01)

(52) U.S. Cl.
CPC ........................ *C07G 1/00* (2013.01)

(58) Field of Classification Search
CPC ........................................... C07G 1/00
See application file for complete search history.

(56) References Cited

U.S. PATENT DOCUMENTS

| 4,556,677 A | 12/1985 | Sodervall et al. |
| 2004/0254231 A1 | 12/2004 | Duan et al. |

(Continued)

FOREIGN PATENT DOCUMENTS

| WO | WO-2016020615 A1 * | 2/2016 | ............ C07D 307/34 |
| WO | WO-2016204682 A1 * | 12/2016 | ............ C10G 1/083 |

OTHER PUBLICATIONS

McCubbin et al; "Organocatalyzed Friedel-Crafts arylation of benzylic alcohols", Tetradhedron Letters. 2010. pp. 2447-2449.

(Continued)

*Primary Examiner* — Liam J Heincer
(74) *Attorney, Agent, or Firm* — Perman & Green, LLP

(57) ABSTRACT

A lignin derivative including a unit of general formula (I):

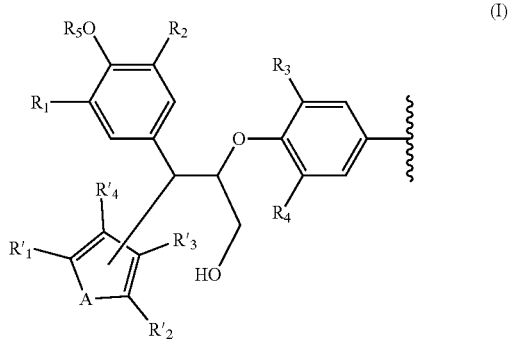

in which $R_1$, $R_2$, $R_3$ and $R_4$, which may be identical or different, each represent a hydrogen atom, a methoxy group —OMe, a hydroxyl group, where appropriate protected by a protective group of a hydroxyl function, or a

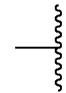

unit $R_5$ represents a hydrogen atom, a protective group of a hydroxyl function or a

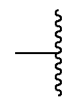

unit; A represents an oxygen atom, a sulfur atom, an —NH group or an —NR' group; and $R'_1$, $R'_2$, $R'_3$ and $R'_4$ each represent a hydrogen atom or a substituent not including a (Continued)

mesomeric-effect electron-withdrawing group conjugated to the aromatic ring, a substituent from $R'_1$, $R'_2$, $R'_3$ and $R'_4$ representing the covalent bond with the benzylic carbon.

18 Claims, 2 Drawing Sheets

(56) References Cited

U.S. PATENT DOCUMENTS

| | | | | |
|---|---|---|---|---|
| 2013/0025191 | A1* | 1/2013 | Chen | C10L 1/14 44/451 |
| 2015/0087031 | A1* | 3/2015 | Jansen | C10L 1/02 435/99 |
| 2015/0136121 | A1* | 5/2015 | Jansen | C13K 1/02 127/55 |
| 2017/0260170 | A1* | 9/2017 | Roumeas | C07D 407/04 |
| 2018/0142177 | A1* | 5/2018 | Dahlstrand | C10G 3/42 |

OTHER PUBLICATIONS

Huston et al. "The Condensation of Some Secondary Aliphatic Alcohols with Benzene in the Presence of Aluminum Chloride", Michigan State College. 1942. vol. 64, pp. 1576-1580.

Li Shuai, et al; "Formaldehyde stabilization facilitates lignin monomer production during biomass depolymerization" Science, vol. 354, No. 6310; Oct. 21, 2016; pp. 329-333.

International Search Report issued in International Patent Application No. PCT/EP2018/076531 dated Dec. 5, 2018.

Roberts et al; "Towards Quantitative Catalytic Lignin Depolymerization"; Chemistry A European Journal, vol. 17, 2011, pp. 5939-5948.

Sawamura et al; "Lignin Functionalization through Chemical Demethylation: Preparation and Tannin-Like Properties of Demethylated Guaiacyl-Type Synthetic Lignins"; ACS Sustainable Chemistry & Engineering, 2017, 5, pp. 5424-5431.

Domingo et al; "The Nucleophilicity N Index in Organic Chemistry"; Organic & Biomolecular Chemistry, 2011, 9, pp. 7168-7175.

Lu et al; "DFRC Method for Lignin Analysis. 1. New Method for B-Aryl Ether Cleavage: Lignin Model Studies", J. Agric. Food Chem. 1997, 45, 4655-4660.

Goncalves et al; "Integrated Processes for Use of Pulps and Lignins Obtained from Sugarcane Bagasse and Straw", Applied Biochemistry and Biotechnology, vol. 121-124, 2005, pp. 821-826.

Molinari et al; "Mild Continuous Hyrdogenolysis of Kraft Lignin over Titanium Nitride-Nickel Catalyst", ACS Catalysis, 2016, 6, pp. 1663-1670.

Torr et al; "Mild Hydrogenolysis of In-Situ and Isolated Pinus Radiata Lignins", Biosource Technology, 2011, 102, pp. 7608-7611.

Vuor et al; "Liquefaction of Kraft Lignin", Holzforschung, vol. 42, No. 5, 1988, pp. 327-334.

Pandey et al; "Lignin Deploymerization and Conversion: A Review of Thermochemical Methods", Chemical Engineering & Technology, 2011, 34, No. 1, pp. 29-41.

Sun et al; "Bright Side of Lignin Depolymerization: Toward New Platform Chemicals", Chemical Reviews, 2018, 118, pp. 614-678.

Zhai et al; "Depolymerization of Lignin Via a Non-Precious Ni-Fe Alloy Catalyst Supported on Activated Carbon", Green Chemistry, 2017, DOI: 10 1039/C7GC00149E.

Rene Milcent, "Chimie Organique: Stereochimie, Entites Reactives et Reactions", EDP Sciences, France, 2007, Chapters 5.5 and 5.6.

Greene, "Protective Groups in Organic Synthesis", Wiley & Sons, 1981, Chapter 2 & 3.

Liengprayoon et al; Glycolipid Composition of Hevea Brasiliensis Latex, Phytochecmistry, 2011.

* cited by examiner

CHEMICALLY STABLE LIGNIN DERIVATIVE AND METHOD FOR PREPARING SAME

CROSS REFERENCE TO RELATED APPLICATIONS

This application is a National Stage of International Application No. PCT/EP2018/076531, having an International Filing Date of 28 Sep. 2018, which designated the United States of America, and which International Application was published under PCT Article 21(2) as WO Publication No. 2019/063826 A1, which claims priority from and the benefit of French Patent Application No. 1759134, filed on 29 Sep. 2017, the disclosures of which are incorporated herein by reference in their entireties.

BACKGROUND

1. Field

The present disclosure lies in the field of preparing molecules of interest from biosourced materials, more specifically from lignocellulosic biomass.

More particularly, the present disclosure relates to a particularly chemically stable lignin derivative, as well as to a method for preparing such a lignin derivative. The disclosure also relates to a more general method for depolymerisation of lignin, and to a depolymerisation product derived from lignin, obtainable by such a method.

2. Brief Description of Related Developments

Because of the foreseeable depletion of the easily accessible fossil resources and the environmental issues associated with their use, the petroleum and chemical industries have been led to taking more and more interest in biomass as a source of carbon for the synthesis of molecules.

For this purpose, particular interest has been shown for lignins, one of the components of lignocellulosic biomass. Lignins are macromolecules with a complex, very heterogeneous structure, which are one of the main components of wood, and which are present in the cell walls of vascular plants as well as in some non-vascular organisms such as certain algae and *Hepaticae*.

In particular, lignins represent the most abundant source of natural aromatic compounds, and thus the industrial use of these macromolecules has formed a significant economic area of interest for several decades. More precisely, lignins are organic biopolymers of monolignols, their main component monomers being coumaryl alcohol, coniferyl alcohol and sinapyl alcohol. In terms of their chemical structure, lignins consist of propyl-phenol units bound to each other via various types of bonds, including C—O bonds and C—C bonds, of the bi-aryl ether, bi-aryl, aryl glycerol and β-aryl ether type.

An example of a general formula commonly used to represent lignins is the following:

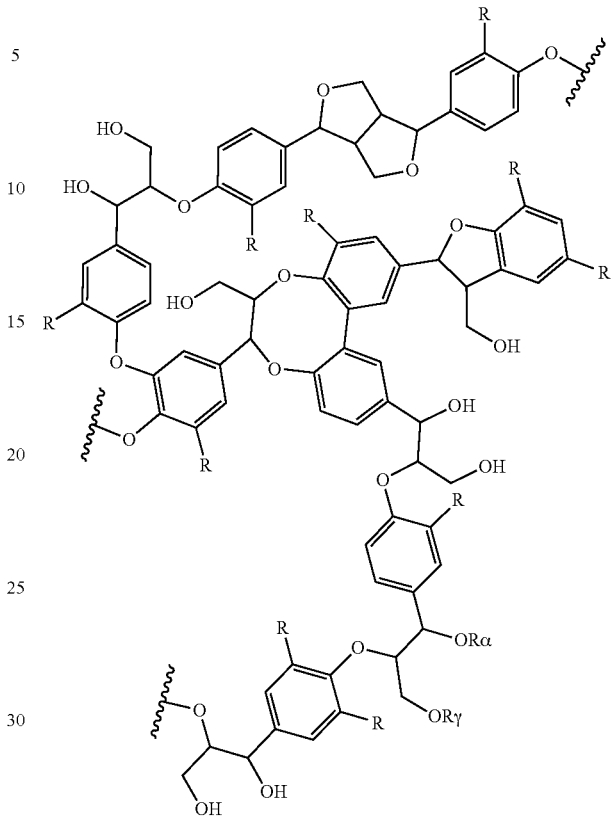

in which formula R indifferently represents a hydrogen atom, an —OMe methoxy group or a

motif, Rα represents a hydrogen atom or an aryl group and Rγ represents an atoms of hydrogen, an acetyl group or a cinnamoyl derivative (feruoyl for example).

The most abundant bonds therein are bonds of the β-O-4 type, illustrated in a more detailed manner in the following formula of a characteristic constitutional unit of lignins:

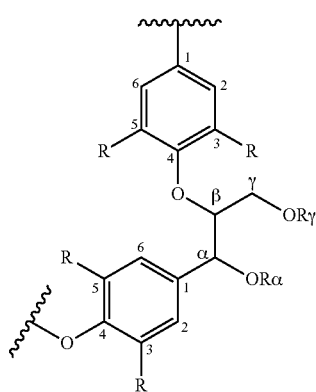

In this structure, the presence of a benzyl hydroxyl (Rα=H) or aryl ether (Rα=aryl) group on the carbon atom in the α position, that is to say on the benzylic carbon, is noted.

However, despite strongly increasing volumes due to the increasing use of lignocellulose for the creation of second-generation biofuels, lignins remain at present sparsely used, in particular for uses with medium to high added value. The reason is the nature of lignins, which are heterogeneous, polydispersed biopolymers having a variable structure, and the fact that they are often modified and/or degraded by the very methods that are implemented to obtain them, which currently forms a true obstacle to their use in fine chemistry.

Numerous works took in particular interest in the development of methods for depolymerisation of lignins, so as to obtain therefrom the constitutive monophenols, which are more easily usable in the chemistry sectors, in particular the chemistry called specialty chemistry. Various chemical, thermal and/or catalytic methods for depolymerisation of the lignins have thus been proposed by the prior art.

Catalytic hydrogenolysis, or hydrocracking, is in particular described as the currently available technique allowing to access the best yields of depolymerisation of lignins. This type of method is based on the presence in the lignin of bonds that are sensitive to hydrogenolysis, and in particular of the glycerol-β-O-4-aryl bonds mentioned above.

However, the reactivity of the p-alkoxybenzyl hydroxyl groups, on the carbons in the α position, which are nucleofugal in an acidic medium, generates during the hydrogenolysis reaction cationic intermediates that are highly reactive and prone to rearrangements, in particular by condensation with the phenols and the aryl ethers present in the structure of lignins. These rearrangements provoke the formation of condensed molecules of lignins, which are not very extractible and difficult to depolymerise. Thus, the yields of the reactions of depolymerisation of lignins by hydrogenolysis remain relatively low.

It has been proposed by the prior art, illustrated in particular by the publication of Roberts et al., 2011, in Chemistry, 17(31), 5939-48, to depolymerise lignin by an alkaline hydrothermal method. This method, although it allows to obtain monomers and oligomers with good yields, has the disadvantages of consuming a lot of reactants, and of requiring high temperatures and pressures, so that it is costly to implement.

It has otherwise recently been proposed by the prior art, illustrated in particular by the publication of Shuai et al., 2016, in Science, 354 (6310), 329-333, to stabilise lignins by chemical modification during their extraction, by carrying out a hot treatment in a mixture of dioxane and hydrochloric formaldehyde. This stabilisation increases the yields of the later hydrogenolysis reaction, and allows to obtain component monomers of the initial lignin, the guaiacyl and syringyl monomers. However, these yields still remain low, in particular because of the occurrence of recondensation reactions caused by the formation of reactive electrophilic benzyl hydroxymethyl groups, by reaction of the formaldehyde and of the lignin. Moreover, the use of formaldehyde should in general be avoided because of its toxicity for mammals.

It has now been discovered by the present inventors that it is possible to effectively stabilise lignins by a reaction of condensation of p-hydroxybenzyl and p-alkoxybenzyl alcohols of constitutive units of the lignin with specific aromatic nucleophilic reactants, in particular derivatives of furan, of pyrrole or of thiophene. Due to their significant chemical stability, the modified lignins thus obtained, functionalised by substitution of benzyl hydroxyl groups by the aromatic nucleophilic reactant, can be easily depolymerised by hydrogenolysis, to form in particular monophenols, with particularly high yields.

SUMMARY

Thus, the present disclosure aims to overcome the disadvantages of the methods proposed by the prior art for the depolymerisation of lignins, in particular the disadvantages disclosed above, by proposing a method that allows to produce, with a high yield, monophenol organic molecules from lignin, isolated or in the form of lignocellulosic biomass. The present disclosure aims in particular to propose a lignin derivative that can, by a suitable reaction, in particular a reaction of hydrolysis or hydrogenolysis, be easily depolymerised with a high yield, to obtain constitutive monomers of lignin, in particular aromatic, in particular phenol, monomers that are of great interest in the field of chemistry.

The present disclosure further aims for the method to be easy and fast to implement, and moreover at low-cost. An additional goal of the disclosure is for the implementation of this method to be respectful of the environment, and without danger to human beings.

Thus, according to a first aspect, it is proposed according to the present disclosure a lignin derivative comprising a unit having the general formula (I):

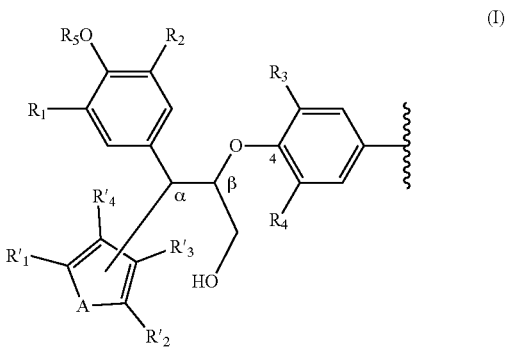

in which:

$R_1$, $R_2$, $R_3$ and $R_4$, which may be identical or different, each represent a hydrogen atom, an —OMe methoxy group, a hydroxyl group, if necessary protected by a hydroxyl-protecting group, or a

motif, $R_5$ represents a hydrogen atom, a hydroxyl-protecting group or a

motif,

A represents an oxygen atom, a sulfur atom or an —NR' group, wherein R' represents a hydrogen atom or a substituent not including any mesomeric-effect electron-withdrawing group conjugated to the aromatic ring, in particular an alkyl group, preferably C1-C4, for example a methyl group, $R'_1$, $R'_2$, $R'_3$ and $R'_4$, which may be identical or different, each represent a hydrogen atom or a substituent not including any mesomeric-effect electron-withdrawing group conjugated to the aromatic ring, one substituent among $R'_1$, $R'_2$, $R'_3$ and $R'_4$ representing the covalent bond with the benzylic carbon, or one of the salts thereof.

The lignin derivative having the general formula (I) according to the disclosure, in which the benzyl hydroxyl group naturally present in the α position of the lignin has been substituted by a metallole, more particularly by a derivative of furan, of thiophene or of pyrrole, is very chemically stable. Subjected to a hydrocracking reaction, it thus allows to obtain constitutive monomers of lignin with particularly high yields.

It can further be obtained under relatively mild conditions, in particular by a method as will be described below in the present description.

The configurations of the lignin derivative according to the disclosure in which $R_1$, $R_2$, $R_3$ and/or $R_4$ represent a hydroxyl group can be obtained, from lignin, for example by cleavage of methoxy groups naturally borne by lignin by a chemical, biophysical or microbial demethylation treatment, as described for example by Sawamura et al. 2017, in ACS Sustainable Chemistry and Engineering, 5(6), 5424-5431.

The general formula (I) above covers all the possible combinations of isomer forms at the asymmetric carbons, and all the mixtures of such isomer forms. Starting from a mixture of isomers, each specific isomer can be obtained by purification methods conventional per se for a person skilled in the art.

"Hydroxyl-protecting group" here means any group used in a manner conventional per se to protect a hydroxyl function, more particularly a phenolic hydroxyl, that is to say to mask its reactivity with a view to later reactions. It is within the ability of a person skilled in the art to be able to identify the protecting groups for a hydroxyl function that can be implemented in the context of the disclosure. These groups are in particular listed in the book of Greene, "Protective groups in Organic Synthesis", Wiley & Sons, 1981, in particular in chapter 2, which relates specifically to the protection of hydroxyl groups, and chapter 3 which relates to the protection of phenols and catechols.

Each of the hydroxyl-protecting groups can for example be chosen from the alkyl, acyl, in particular acetyl, benzyl, silyl, sulphonyl, alkoxy-alkyl, for example methoxymethyl, methoxyethoxymethyl or benzoxyméthyl, groups, etc.

The hydroxyl-protecting groups of the derivative according to the disclosure can be all identical, or be different from each other, the protecting groups borne by the hydroxyl functions of a same ring then being preferably identical to each other.

The expression "aromatic ring" designates in the present description, by convention, the 5-membered aromatic ring derived from furan, from thiophene or from pyrrole, which is bonded to the lignin backbone. Thus, by convention, this expression will never be used in the present description to designate one of the aromatic cycles forming part of the lignin macromolecule itself.

"Substituent not including any mesomeric-effect electron-withdrawing group conjugated to the aromatic ring" here means any substituent which does not include any mesomeric-effect electron-withdrawing group that is bonded either directly, or by conjugation, to the aromatic ring of the lignin derivative of general formula (I). According to the present disclosure, the electron-withdrawing nature of a group is assessed with respect to the aromatic ring of the metallole to which the substituent bearing this group is bonded. Thus, according to the disclosure, the aromatic ring of the metallole does not carry any substituent capable of depleting it of electrons, that is to say any substituent including a mesomeric-effect electron-withdrawing (this nature being appreciated with respect to this aromatic ring) group that is conjugated to it.

It is within the skills of a person skilled in the art to determine, based on his general knowledge, which substituents fall or do not fall within such a definition. The general knowledge of a person skilled in the art on the subject is in particular illustrated by the book of René Milcent, Chimie organique: Stéréochimie, entités réactives et réactions, EDP Sciences—2007, in particular in chapters 5.5 and 5.6.

For example, substituents excluded from the definition of $R'_1$, $R'_2$, $R'_3$ and $R'_4$ are substituents including, bound directly or by conjugation to the aromatic ring, an electron-withdrawing radical such as a nitro, carbonyl, carboxylic or sulphonic, optionally salified or esterified, amide, cyano, sulphonyl, radical, etc.

When, in the general formula (I), $R_5$ represents a hydrogen atom or a hydroxyl-protecting group, the unit having the general formula (I) is a terminal unit of the lignin derivative. When $R_5$ represents a motif:

the unit of general formula (I) is an extension unit of the lignin derivative.

The number of $R_1$, $R_2$, $R_3$ and $R_4$ groups representing a

motif in the unit of general formula (I) is variable, and depends on the degree of cross-linking of the lignin derivative according to the disclosure. Preferably, in the unit of general formula (I), none of $R_1$, $R_2$, $R_3$ and $R_4$ represents a

motif. In alternative aspects of the disclosure, only one of $R_1$, $R_2$, $R_3$ and $R_4$ represents a

motif. The disclosure does not, however, exclude two, three or even all four of $R_1$, $R_2$, $R_3$ and $R_4$ representing a

motif.

The lignin derivative according to the disclosure can in particular be such that in the general formula (I), $R'_1$ and $R'_2$, identical or different, each represent, except for the substituent forming the covalent bond with the benzylic carbon:

a hydrogen atom, or a linear, branched and/or cyclic, saturated and/or unsaturated, optionally aromatic, carbon radical, which may include a single cycle or a plurality of condensed cycles, optionally substituted, optionally including one or more heteroatoms and/or one or more groups comprising one or more heteroatoms, each heteroatom being in particular chosen from O, N, P, Si and S, said carbon radical not including any mesomeric-effect electron-withdrawing group conjugated to the aromatic ring.

The lignin derivative according to the disclosure can in particular be such that in the general formula (I), $R'_3$ and $R'_4$, identical or different, each represent, except for the substituent forming the covalent bond with the benzylic carbon:

a hydrogen atom, a group including an inductive-effect or mesomeric-effect electron-donating radical, bonded directly or by conjugation to the aromatic ring, for example chosen from an amino, oxy or thio radical, optionally substituted, said group not including any mesomeric-effect electron-withdrawing group conjugated to the aromatic ring, or a linear, branched and/or cyclic, saturated and/or unsaturated, optionally aromatic, carbon radical, which may include a single cycle or a plurality of condensed cycles, optionally substituted, optionally including one or more heteroatoms and/or one or more groups comprising one or more heteroatoms, each heteroatom being in particular chosen from O, N, P, Si and S, said carbon radical not including any mesomeric-effect electron-withdrawing group conjugated to the aromatic ring.

Like for the electron-withdrawing nature, according to the present disclosure, the electron-donating nature of a radical is assessed with respect to the aromatic ring of the metallole to which the substituent bearing this radical is bonded. Thus, in specific aspects of the disclosure, the aromatic ring of the metallole bears one or more substituents capable of enriching it with electrons via an inductive or mesomeric effect, that is to say including an electron-donating (with respect to this aromatic ring) group bonded directly or by conjugation to this aromatic ring.

It is within the skills of a person skilled in the art to determine which groups are electron-donating or electron-withdrawing with respect to the aromatic ring of the metallole. For this purpose, the person skilled in the art can in particular refer to the book of René Milcent, Chimie organique: Stéréochimie, entités réactives et réactions, EDP Sciences—2007, which illustrates its general knowledge on the subject.

In particular, each of $R'_1$, $R'_2$, $R'_3$ and $R'_4$ can represent, independently of the others, an alkyl group, in particular with a linear chain, preferably C1-C18, more preferably C1-C10, and preferably C1-C4, for example a methyl group or an ethyl group.

Preferably, in the general formula (I), at least one substituent among $R'_1$, $R'_2$, $R'_3$ and $R'_4$ represents a hydrogen atom.

The compound according to the disclosure can in particular be such that in the general formula (I), $R'_1$, $R'_2$, $R'_3$ and $R'_4$, identical or different, each represent, when they do not form the covalent bond with the benzylic carbon, a hydrogen atom or a linear or branched hydrocarbon radical, optionally substituted, optionally interrupted by one or more heteroatoms and/or by one or more groups comprising one or more heteroatoms, wherein each heteroatom can for example be chosen from O, N, P, Si and S, said hydrocarbon radical not including any mesomeric-effect electron-withdrawing group conjugated to the aromatic ring.

In alternative aspects of the disclosure, in the general formula (I) above, $R'_1$, $R'_2$, $R'_3$ and $R'_4$ satisfy in particular one or more of the following features, taken alone or in each of their possible combinations:

$R'_1$ represents the covalent bond with the benzylic carbon, $R'_3$ and $R'_4$ each represent a hydrogen atom, $R'_2$ represents a hydrogen atom or $R'_2$ represents an alkyl group, in particular with a linear chain, preferably C1-C18, more preferably C1-C10, and preferably C1-C4. In particular $R'_2$ can represent a methyl radical or an ethyl group.

In particular, in the general formula (I), three substituents among $R'_1$, $R'_2$, $R'_3$ and $R'_4$ can all three represent a hydrogen atom, the compound according to the disclosure then having the general formula (Ia):

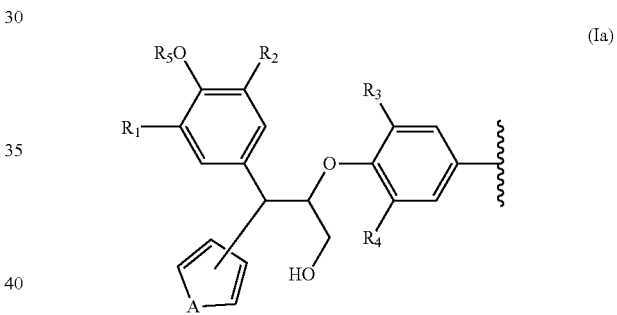

in which A, $R_1$, $R_2$, $R_3$, $R_4$ and $R_5$ are as described above.

In particular, in this general formula (Ia), $R'_2$, $R'_3$ and $R'_4$ can all three represent a hydrogen atom, and $R'_1$ can represent the covalent bond with the benzylic carbon.

In alternative aspects of the disclosure, A, $R_1$, $R_2$, $R_3$, $R_4$, $R_5$ and $R'_1$, $R'_2$, $R'_3$ and $R'_4$ are as defined above in reference to the general formula (I), at least one group among $R'_1$, $R'_2$, $R'_3$ and $R'_4$ representing however neither a hydrogen atom nor the covalent bond with the benzylic carbon. The group(s) among $R'_1$, $R'_2$, $R'_3$ and $R'_4$ representing neither a hydrogen atom nor the covalent bond with the benzylic carbon can then represent an alkyl group, in particular C1-C4, for example a methyl group or an ethyl group.

The lignin derivative according to the disclosure can in particular be such that, in the general formula (I), two groups among $R'_1$, $R'_3$ and $R'_4$ each represent a hydrogen atom, the third of these groups representing the covalent bond with the benzylic carbon, and $R'_2$ represents an alkyl group, in particular with a linear chain, preferably C1-C18, more preferably C1-C10, and preferentially C1-C4. In particular, $R'_2$ can then represent a methyl radical, the compound then having the following general formula (Ib), in which A, $R_1$, $R_2$, $R_3$, $R_4$ and $R_5$ are as defined above:

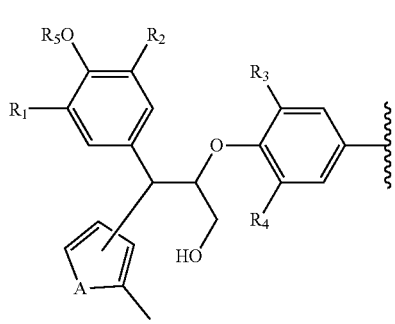

(Ib)

The lignin derivative according to the disclosure can in particular be such that, in the general formula (I), $R'_3$ and $R'_4$ each represent a hydrogen atom, $R'_1$ represents the covalent bond with the benzylic carbon, and $R'_2$ represents an alkyl group, in particular with a linear chain, preferably C1-C18, more preferably C1-C10, and preferentially C1-C4.

In the general formula (I), A can represent an oxygen atom. The aromatic ring bonded onto the lignin macromolecule is then furan, or a furan derivative. These compounds present in particular the advantages of being biosourced, organo-soluble and of having a sufficient reactivity at moderate temperatures, that is to say at approximately 40 to 60° C., in order for the substitution reaction to occur on the benzylic carbon, in α position of the constitutive unit of the lignin.

The lignin derivative according to the disclosure then satisfies the general formula (Ic):

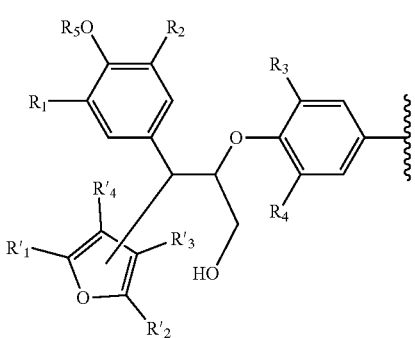

(Ic)

in which $R_1$, $R_2$, $R_3$, $R_4$ and $R_5$, and $R'_1$, $R'_2$, $R'_3$ et $R'_4$, are as described above.

In alternative aspects of the disclosure, A represents an oxygen atom, $R'_1$ represents the covalent bond with the benzylic carbon, $R'_2$ represents a C1-C18, and in particular C1-C7, in particular C1-C4, alkyl group, for example a methyl group or an n-pentyl group, and $R'_3$ and $R'_4$ each represent a hydrogen atom. The lignin derivative, in which the lignin is then functionalised by a furan derivative, then satisfies the general formula (Ic'):

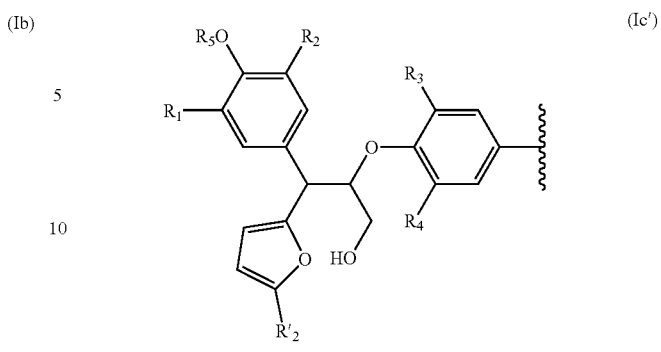

(Ic')

in which $R_1$, $R_2$, $R_3$ and $R_4$ are as described above, and $R'_2$ represents a C1-C18, in particular C1-C7, alkyl group, for example a methyl group or an n-pentyl group.

Preferably, when in the general formula (I), A represents an oxygen atom, $R'_1$, $R'_2$ and one among $R'_3$ and $R'_4$, do not simultaneously all three represent a methyl group.

In the general formula (I), A can represent an —NR' group. The aromatic ring bonded onto the lignin macromolecule is then pyrrole, or a pyrrole derivative. The lignin derivative according to the disclosure then has the general formula (Id):

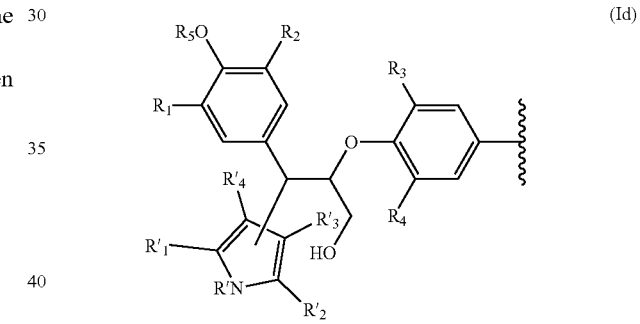

(Id)

in which $R_1$, $R_2$, $R_3$, $R_4$ and $R_5$, and $R'$, $R'_1$, $R'_2$, $R'_3$ and $R'_4$, are as described above.

In an alternative aspect of the disclosure, A represents an —NR' group, where R' represents a hydrogen atom or a C1-C4 alkyl radical, in particular a methyl group, $R'_1$ represents the covalent bond with the benzylic carbon, and $R'_2$, $R'_3$ and $R'_4$ each represent a hydrogen atom. The lignin derivative, in which lignin is then functionalised by the pyrrole, then satisfies the general formula (Id'):

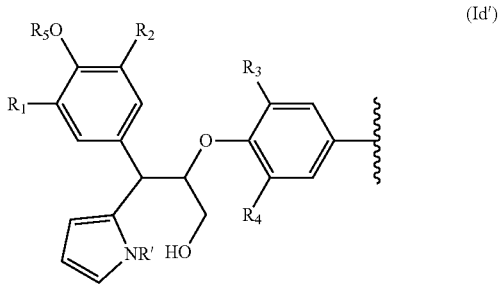

(Id')

in which $R_1$, $R_2$, $R_3$, $R_4$ and $R_5$ are as described above.

In another alternative aspect of the disclosure, A represents an —NR' group, where R' represents a hydrogen atom or a C1-C4 alkyl radical, $R'_1$ represents the covalent bond with the benzylic carbon, $R'_2$, $R'_3$ and $R'_4$ each represent an alkyl group, preferably C1-C4, and for example a methyl group or an ethyl group. In particular, in the general formula (I), A can represent an —NH group or an —NMe group, $R'_1$ can represent the covalent bond with the benzylic carbon, $R'_2$ and $R'_4$ can each represent a methyl group and $R'_3$ can represent an ethyl group.

Otherwise, in the general formula (I), A can represent an —NMe group, $R'_1$ can represent the covalent bond with the benzylic carbon, and $R'_2$, $R'_3$ and $R'_4$ can each represent a hydrogen atom.

In the general formula (I), A can otherwise represent a sulfur atom. The aromatic ring bonded onto the lignin macromolecule is thus thiophene, or a derivative of thiophene.

The lignin derivative according to the disclosure then has the general formula (Ie):

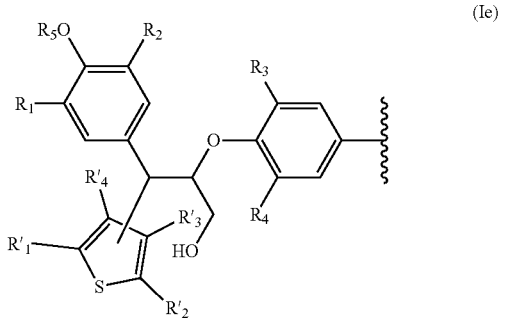

in which $R_1$, $R_2$, $R_3$, $R_4$ and $R_5$, and $R'_1$, $R'_2$, $R'_3$ et $R'_4$, are as described above.

In particular, in the general formula (I), A can represent a sulfur atom, $R'_1$ can represent the covalent bond with the benzylic carbon, $R'_3$ and $R'_4$ can each represent a hydrogen atom and $R'_2$ can represent an ethyl group.

The lignin derivative according to the disclosure, which is chemically stable and which can advantageously be available in large quantities, is useful in itself for a large number of uses.

It can in particular be easily functionalised, in either acidic, neutral or basic conditions, with a view to the preparation of active products taking advantageously advantage of the properties related not only to the presence in its structure of a lignin backbone, with an aromatic structure comprising numerous phenol and/or phenyl ether units, but also of the aromatic ring grafted onto this backbone. In particular, substituents including electron-withdrawing groups such as, for example, those excluded for the aromatic ring of the compound of general formula (I) can be inserted into its structure to confer additional functionalities onto this compound.

For example, the lignin derivative according to the disclosure can be functionalised at the metallole unit, for example by a fatty acid, conferring greater lipophilicity on it. The lignin derivative according to the disclosure can for example then be used in the field of surface treatment.

The lignin derivative according to the disclosure further constitutes a starting compound for obtaining many molecules of interest.

It can in particular be used, functionalised or not, in the field of materials, in particular of adhesives and resins, as a replacement for the conventionally used phenols, taking advantage in particular of its particularly advantageous properties in terms of mechanical strength, and/or its hydrophobic properties.

When in the general formula (I), A represents an oxygen atom, the lignin derivative satisfying this formula advantageously has increased lipophilicity, which considerably facilitates its extraction, in particular by organic solvents.

According to another aspect, the present disclosure relates to a method for preparing a lignin derivative, in particular a lignin derivative satisfying the general formula (I) above. According to this method, lignin is reacted with a compound having the general formula (II):

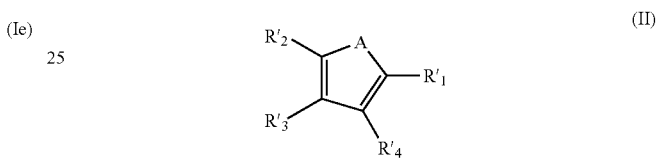

in which

A represents an oxygen atom, a sulfur atom or an —NR' group, wherein R' represents a hydrogen atom or a substituent not including any mesomeric-effect electron-withdrawing group conjugated to the aromatic ring, in particular an alkyl group, preferably C1-C4, for example a methyl group, $R'_1$, $R'_2$, $R'_3$ and $R'_4$, which may be identical or different, each represent a hydrogen atom or a substituent not including any mesomeric-effect electron-withdrawing group conjugated to the aromatic ring, at least one substituent among $R'_1$, $R'_2$, $R'_3$ and $R'_4$ representing a hydrogen atom, or one of the salts thereof, so as to realize the substitution of a hydroxyl group of the lignin, in particular of a group borne by a benzylic carbon, by said compound having the general formula (II).

Here, the expression "hydroxyl group" encompasses both free hydroxyl groups and hydroxyl groups present in the lignin molecule in modified form, in particular in the form of ether or of ester.

The method according to the disclosure can implement a single compound having the general formula (II) above, or a plurality of such compounds, simultaneously or successively.

According to the present disclosure the term lignin encompasses both a single lignin and a mixture of various lignins.

Moreover, the term lignin here means both substantially pure, non-modified lignin, and its derivatives. The term derivatives encompasses according to the present disclosure the products of partial fractioning of lignin, containing a unit having the general formula (III):

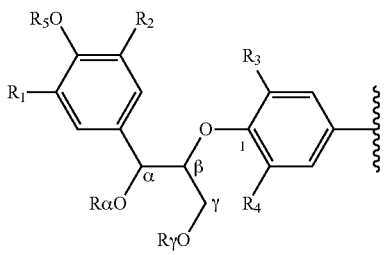

(III)

where Rα, Rγ, R$_1$, R$_2$, R$_3$, R$_4$ and R$_5$ are as described above, as well as the chemical derivatives of lignin, in particular the esterified or etherified derivatives, in which, however, hydroxyl groups located on the benzylic carbons, in the α position, preferably, but not necessarily, remain non-modified.

The lignin can in particular be implemented in the method according to the disclosure in the form of a salt, or in the form of a raw extract, that is to say of lignocellulosic biomass, or in the form of a partially purified extract, containing it in a mixture with other components, or of a substantially pure extract. Such an extract can be obtained according to any method conventional per se for a person skilled in the art, for example implemented in acidic or neutral conditions. For example, the lignin can be implemented in the method according to the disclosure in a form partially purified by the methods known by the name of Organosolv methods.

According to the method according to the disclosure, the compound having the general formula (II) is placed in the presence of lignin in reaction conditions, in particular of temperature, of time and of pH, such that its reaction with the lignin is provoked, leading to the substitution of hydroxyl groups (which may be in modified form, for example of ether or of ester) of the latter by the nucleophilic reactant of general formula (II), in particular at the benzylic carbon, that is to say in the α position with respect to the glycerol-β-O-4-aryl bond. In the method according to the disclosure, the compound of general formula (II) does not play a role of solvent for the lignin, but of a reactant producing with the latter an irreversible chemical reaction.

The coupling of the lignin with the nucleophilic compound of general formula (II) can be verified, at the end of the reaction, by adapted analysis methods, such as Nuclear Magnetic Resonance (NMR) or gas chromatography coupled with mass spectrometry (GC-MS), by seeking in the lignin molecule, before and after the reaction, the changes in signals that are markers of this coupling. In particular, the shifts, in proton NMR, of the atom of hydrogen (Hα) on the benzylic carbon atom and, in carbon NMR, of the benzylic carbon atom (Cα) of lignin, are modified after reaction of the lignin with the nucleophilic compound. These shifts can in particular vary from 0.3 to 0.6 ppm for Hα and by several tens of ppm for Cα, which makes their detection particularly easy.

The substitution of hydroxyl groups of the lignin by the nucleophilic reactant of general formula (II) can in particular make it possible to eliminate the reactivity of hydroxyl groups, in particular benzylic hydroxyl groups, of the lignin, by an outright elimination of these groups, which has the effect of chemically stabilising the lignin derivative obtained.

In specific aspects, the method according to the disclosure can in particular associated to the following reaction mechanism:

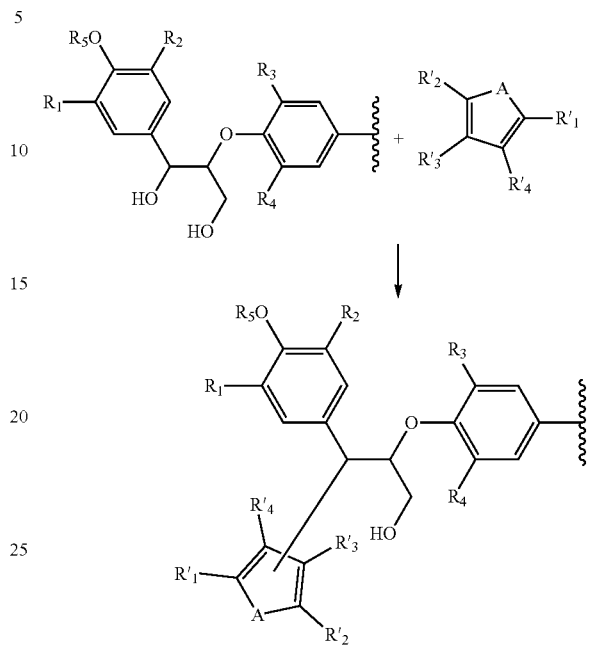

In particular, in the general formula (II), R'$_1$, R'$_2$, R'$_3$ and R'$_4$ can satisfy one of the following features, or any combination of a plurality of these features that are technically compatible:

R'$_1$ and R'$_2$, identical or different, each represent:

a hydrogen atom, or a linear, branched and/or cyclic, saturated and/or unsaturated, optionally aromatic, carbon radical, which may include a single cycle or a plurality of condensed cycles, optionally substituted, optionally including one or more heteroatoms and/or one or more groups comprising one or more heteroatoms;

R'$_3$ and R'$_4$, which may be identical or different, each represent:

a hydrogen atom, a group including an electron-donating radical bonded directly or by conjugation to the aromatic ring, for example chosen from an amino, thio or oxy radical, in particular when A represents an oxygen atom or a sulfur atom, this group being optionally substituted, or a linear, branched and/or cyclic, saturated and/or unsaturated, optionally aromatic, carbon radical, which may include a single cycle or a plurality of condensed cycles, optionally substituted, optionally including one or more heteroatoms and/or one or more groups comprising one or more heteroatoms;

at least two substituents among R'$_1$, R'$_2$, R'$_3$ and R'$_4$ represent a hydrogen atom;

R'$_1$, R'$_2$, R'$_3$ and R'$_4$, identical or different, each represent a hydrogen atom or a linear or branched hydrocarbon radical, optionally substituted, optionally interrupted by one or more heteroatoms and/or by one or more groups comprising one or more heteroatoms, said hydrocarbon radical not including any mesomeric-effect electron-withdrawing group conjugated to the aromatic ring;

R'$_1$, R'$_3$ and R'$_4$ each represent a hydrogen atom;

R'$_2$ represents an alkyl group, in particular with a linear chain, preferably C1-C18, more preferably C1-C10, and preferentially C1-C4; R'$_2$ representing for example a methyl radical or an ethyl radical;

R'$_2$ represents a hydrogen atom;

at least one group among R'$_1$, R'$_2$, R'$_3$ and R'$_4$ does not represent a hydrogen atom.

In specific aspects of the disclosure, in the general formula (II):

R'$_1$ represents a hydrogen atom;

R'$_2$ represents a hydrogen atom or an alkyl group, in particular with a linear chain, preferably C1-C18, more preferably C1-C10, and preferentially C1-C4, for example a methyl radical or an ethyl radical;

R'$_3$ and R'$_4$ each represent a hydrogen atom.

In specific aspects of the disclosure, in the general formula (II), A represents an oxygen atom. The compound having the general formula (II) is then furan (in which R'$_1$, R'$_2$, R'$_3$ and R'$_4$ all represent a hydrogen atom), or a furan derivative, such as sylvane (in which R'$_2$ represents a methyl group).

Furan and its derivatives present in particular the advantage of being, like lignins, biosourced: they can be obtained from biomass, in particular from products derived from furaldehyde, the latter coming from methods for dehydration of pentoses (in particular coming from xylans), or present in the form of furan groups in certain lipids as described for example by Liengprayoon et al., 2011, in Phytochemistry 72, 1902-1913. Furan, just like its derivatives, is consequently particularly well suited for use in a method satisfying the principles of green and sustainable chemistry.

When in the general formula (II), A represents an oxygen atom, R'$_1$, R'$_2$, R'$_3$ and R'$_4$ can for example be such that, in the general formula (II): R'$_1$ represents a hydrogen atom, R'$_2$ represents a C1-C18, in particular C1-C7, alkyl group, for example a methyl group or an n-pentyl group, and R'$_3$ and R'$_4$ each represent a hydrogen atom.

Preferably, when in the general formula (II), A represents an oxygen atom, R'$_1$, R'$_2$ and one of the groups among R'$_3$ and R'$_4$ do not simultaneously all three represent a methyl group, and the other of the groups among R'$_3$ and R'$_4$ represents a hydrogen atom.

In specific aspects of the disclosure, in the general formula (II), A represents an oxygen atom, R'$_1$ represents a hydrogen atom, and at least one of R'$_2$, R'$_3$ and R'$_4$, and in particular two groups among R'$_2$, R'$_3$ and R'$_4$, represent(s) a C1-C4 alkyl group, in particular a methyl group or an ethyl group.

Otherwise, R'$_1$ and R'$_2$ can each represent a C1-C4 alkyl group, in particular a methyl group or an ethyl group, and at least one among R'$_3$ and R'$_4$ can represent a hydrogen atom.

The compound having the general formula (II) can for example be chosen from 2-methylfuran, 2-ethylfuran, 2,3-dimethylfurane and 2,5-dimethylfuran.

In specific aspects of the disclosure, in the general formula (II), A represents a sulfur atom. The compound of general formula (II) is then thiophene (in which R'$_1$, R'$_2$, R'$_3$ and R'$_4$ all represent a hydrogen atom), or a derivative of thiophene.

For example, in the general formula (II), A can represent a sulfur atom, R'$_1$, R'$_3$ and R'$_4$ can each represent a hydrogen atom and R'$_2$ can represent an ethyl group. The compound of general formula (II) is then 2-ethylthiophene.

In other specific aspects of the disclosure, in the general formula (II), A represents an —NR' group, wherein R' represents a hydrogen atom or a substituent not including any mesomeric-effect electron-withdrawing group conjugated to the aromatic ring, in particular a C1-C4 alkyl radical, for example a methyl group. The compound having the general formula (II) is then pyrrole (in which A represents an —NH group and R'$_1$, R'$_2$, R'$_3$ and R'$_4$ all represent a hydrogen atom), or a derivative of pyrrole.

Derivatives of pyrrole that can be implemented in the context of the disclosure are such that, in the general formula (II), A represents an —NR' group, wherein R' represents a hydrogen atom or a substituent not including any mesomeric-effect electron-withdrawing group conjugated to the aromatic ring, in particular a C1-C4 alkyl radical, for example a methyl group, R'$_1$ represents the covalent bond with the benzylic carbon, R'$_2$, R'$_3$ and R'$_4$ each represent an alkyl group, preferably C1-C4, and for example a methyl group or an ethyl group.

In an alternative aspect of the disclosure, A represents an —NR' group, wherein R' represents a hydrogen atom or a C1-C4 alkyl radical, in particular a methyl group, and R'$_1$, R'$_2$, R'$_3$ and R'$_4$ each represent a hydrogen atom. The compound having the general formula (II) can for example be N-methylpyrrole.

In particular, in the general formula (II), A can represent an —NH group or an —NMe group, R'$_1$ can represent a hydrogen atom, R'$_2$ and R'$_4$ can each represent a methyl group and R'$_3$ can represent an ethyl group. The compound having the general formula (II) can for example be 2,4-dimethyl-3-ethyl-pyrrole.

The method according to the disclosure is particularly simple to implement, at a low cost. It is further particularly respectful of the environment.

The method according to the disclosure can be implemented directly on lignocellulosic biomass, for example on sawdust, that is to say without a previous step of extraction of the lignin from this biomass. It then forms in particular a treatment of hydrophobation of the wood.

In such a configuration, the method according to the disclosure can include, as a final step, a step of extraction of the lignin derivative obtained from the biomass. Any method conventional per se can be implemented for this purpose.

The method according to the disclosure can otherwise be implemented on lignin that has been previously extracted from lignocellulosic biomass, for example in an acidic or neutral medium, such as Organosolv lignin.

The method according to the disclosure can yet otherwise be implemented simultaneously to a method for extraction of lignin from lignocellulosic biomass, that is to say during steps of extraction of lignin from biomass containing it, simultaneously to these steps, and in the same reactor (reaction called "one pot"). For example, the method according to the disclosure can be implemented by addition of the metallole having the general formula (II) into the reactor in which the extraction of lignin from biomass is carried out according to the Organosolv method. A lignin derivative according to the present disclosure is thus advantageously directly obtained at the end of the method for extraction of lignin from lignocellulosic biomass.

The exact optimal operational parameters of the method according to the disclosure depend on the specific structure of the compound of general formula (II) which is implemented. It is within the skills of a person skilled in the art to determine these parameters in a suitable manner, for each specific compound, on the basis of the more general preferred features mentioned below, in order to obtain the best rate of substitution by the compound of general formula (II) at the Cα benzylic carbons of lignin.

The exact quantity of compound of general formula (II) to implement depends more particularly on the nucleophilic force of this compound, on the quantity of benzylic carbon atoms (Cα) of the lignin to be substituted.

The nucleophilic force of the compound of general formula (II) can be evaluated theoretically, for example by calculation of the nucleophilicity index N of this compound according to the density functional theory (called DFT for Density Functional Theory), described in the publication of Domingo and Perez, 2011, in Org. Biomol. Chem. 9, 7168-7175, and comparison of this index to that of other compounds for which the nucleophilic force has been determined experimentally, for example the compounds forming the object of the examples below.

The quantity of benzylic carbons Cα in the lignin can be determined by the method of derivatization followed by reductive cleavage, called DFRC, described in the publication of Lu and Ralph, 1997, in J. Agric. Food Chem. 45, 4655-4660. This method involves selectively substituting the —ORα groups borne by the benzylic carbons Cα by bromine atoms. The bond to the bromine atom causes in NMR characteristic shifts of the signals that are associated with the Cα and with the Hα (atom of hydrogen borne by the Cα benzylic carbon). The quantity of Hα and of Cα can be assayed in NMR by external calibration, and compared to the mass of extracted lignin.

The number of molar equivalents of compound of general formula (II) implemented in the method according to the disclosure is preferably greater than or equal to the quantity of benzylic carbons Cα of lignin.

In general, the lower the nucleophilic force of the compound of general formula (II), the more it is preferable that the number of molar equivalents of this compound implemented in the method according to the disclosure be high.

Preferably, the compound(s) having the general formula (II) is/are introduced into the reaction medium in a quantity such that the number of molar equivalents of the compound(s) having the general formula (II) implemented, with respect to the number of benzylic carbons of the lignin, is between 2 and 15.

The method according to the disclosure can be implemented in basic conditions.

Preferably, the reaction between the lignin and the compound of general formula (II) is carried out in an acidic medium, in conditions ensuring that the least possible degradation of the reactants occurs.

For this purpose, any type of acid can be used. The reaction between the lignin and the compound having the general formula (II) can for example be carried out in the presence of an acid chosen from the acids routinely used in the industrial field, such as sulphuric acid ($H_2SO_4$), hydrochloric acid (HCl), methanesulphonic acid (MsOH), formic acid and acetic acid, or a mixture of such acids.

The solvent implemented for the reaction between the lignin and the compound having the general formula (II) can also be of various types.

In specific aspects of the disclosure, the reaction between the lignin and the compound having the general formula (II) is carried out in an organic solvent, alone or in a mixture with water. Here, the expression "organic solvent" encompasses the mixtures of organic solvents.

The organic solvent implemented is preferably polar, and preferably miscible in water. This solvent can in particular be chosen from the organic solvents such as glyme (dimethoxyethane), tetrahydrofuran or dioxane, including the mixtures of such organic solvents, and/or from the alcohols, such as methanol, ethanol, isopropanol, butanol or tert-butanol, including the mixtures of alcohols.

The step of reaction between the lignin and the compound having the general formula (II) is preferably carried out at a temperature lower than or equal to the boiling temperature of the compound of general formula (II) at the pressure applied in the reactor, and at a temperature lower than or equal to the boiling temperature of the solvent at this same pressure. For example, when the reaction is carried out at atmospheric pressure, temperatures between 30° C. and 65° C. are particularly preferred in the context of the disclosure.

As for the contact time between the lignin and the compound having the general formula (II), it is sufficiently long to allow the reaction of substitution of the targeted hydroxyl groups of lignin, by the compound having the general formula (II), to occur.

According to another aspect, the present disclosure relates to a method for depolymerisation of lignin, which comprises the two successive steps of:

implementing a method for preparing a lignin derivative according to the disclosure, satisfying one or more of the above features, so as to in particular obtain a lignin derivative, in particular a lignin derivative having the general formula (I), and cracking of the lignin derivative thus obtained.

Cracking here means the depolymerisation strictly speaking of the lignin derivative, that is to say the cleavage of a bond of the polymer backbone of the lignin, producing the formation of constitutive monomer units thereof, in particular the cleavage of the glycerol-β-O-4-aryl bond.

The cracking step can be carried out by any method conventional per se for a person skilled in the art, for example by acid-catalysed depolymerisation (acidolysis), base-catalysed depolymerisation (hydrolysis in alkaline medium), heat-catalysed depolymerisation (thermolysis, pyrolysis), oxidative depolymerisation (in the presence of an oxidiser) or reductive depolymerisation (hydrogenolysis).

When the step of cracking/depolymerisation of the lignin derivative is carried out by hydrogenolysis, the hydrogenolysis can be carried out according to any method conventional per se for a person skilled in the art. As examples of such methods, mention can be made of those described in the publications of Goncalves, et al., 2002, Applied biochemistry and biotechnology 98-100, 1213-1219; of Molinar et al., 2016, ACS Catalysis 6 (3), 1663-1670; of Torr et al., 2011, Bioresource Technology, 102 (16), 7608-7611; of Shuai et al., 2016 mentioned above; or of Zhai et al., 2017, Green Chemistry, 19,1895-1903.

When the step of cracking/depolymerisation of the lignin derivative is carried out by hydrolysis, the hydrolysis can be carried out according to any method conventional per se for a person skilled in the art. As examples of such methods, mention can be made of those described in the aforementioned publication of Roberts et al., 2011.

When the step of cracking/depolymerisation of the lignin derivative is carried out by acidolysis, this step can be carried out in either a non-aqueous solvent or an aqueous solvent, for example in an alcoholic medium. This reaction can be carried out in any manner conventional per se, for example as described in the publication of Vuori et al. 1988, Holzforschung, 42: 327-334.

When the step of cracking/depolymerisation of the lignin derivative is carried out by pyrolysis, the temperature applied can for example be between 350 and 1200° C. Here again, any method conventional per se for a person skilled in the art can be implemented, for example those described in the publication of Pandey et al., 2011, Chemical Engineering & Technology, 34: 29-41.

More generally, the step of cracking/depolymerisation of the lignin derivative can be carried out by any method described in the review of Sun et al., 2016, Chemical Reviews., 118: 614-678.

According to the disclosure, the step of cracking/depolymerisation can also be implemented on a lignin derivative comprising a unit having the general formula (I) obtained by a method different than the method for preparing a lignin derivative according to the present disclosure.

In specific aspects of the disclosure, the two steps above are carried out successively in the same reactor. Preferably, no step, in particular of purification, or of changing solvent, is interposed between these two steps.

The method for depolymerisation of lignin according to the disclosure advantageously leads to obtaining monophenols. According to the cracking/depolymerisation conditions applied, the aromatic ring coming from the compound of general formula (II) is preserved intact, or it undergoes a controlled hydrogenation to give rise to a cyclic or open non-aromatic derivative, while preserving the phenolic ring coming from the lignin macromolecule, advantageously paving the way for a plurality of types of derivatives that can be used for various uses.

Another aspect of the present disclosure relates to a depolymerisation product, derived from lignin, obtainable by a method for depolymerisation of lignin according to the disclosure, satisfying one or more of the above features.

This depolymerisation product can in particular be a derivative of the guaiacyl monomer, a derivative of the syringyl monomer or a p-hydroxyphenyl derivative.

This depolymerisation product can in particular have one of the following general formulas (IVa) to (IVl):

(IVa)
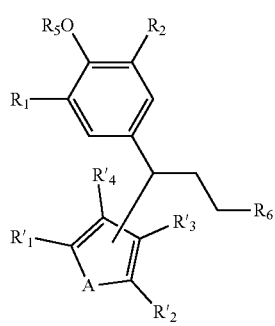

(IVb)
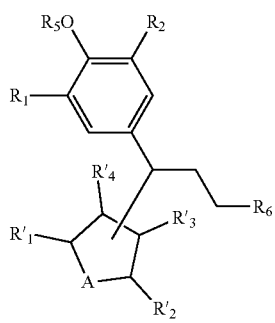

(IVc)
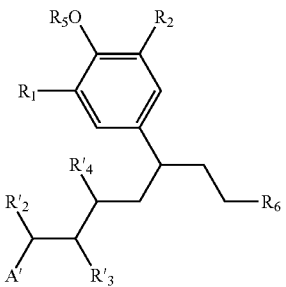

(IVd)
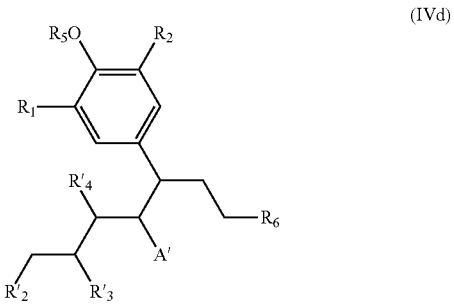

(IVe)
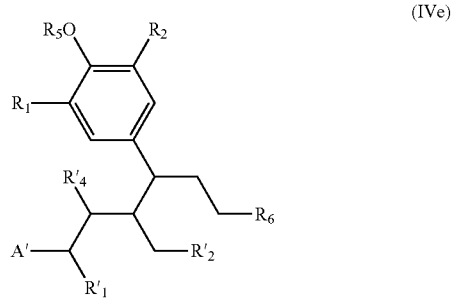

(IVf)
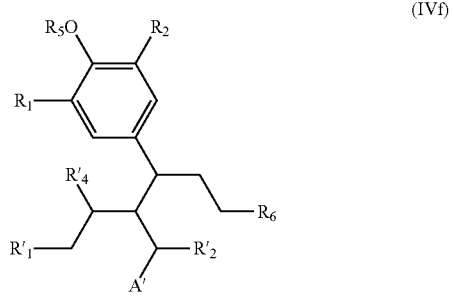

(IVg)
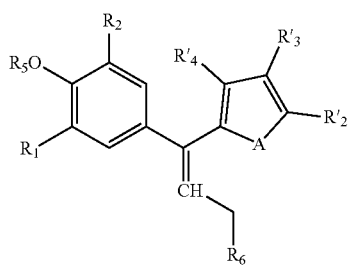

-continued

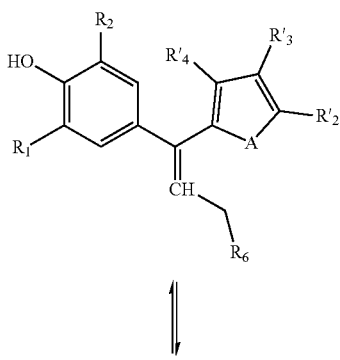

(IVh)

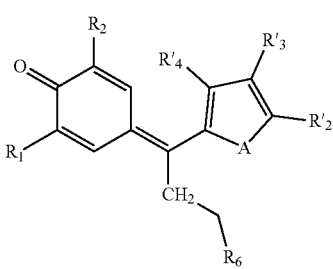

(IVi)

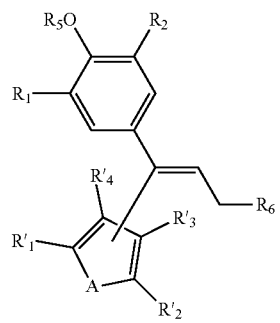

(IVj)

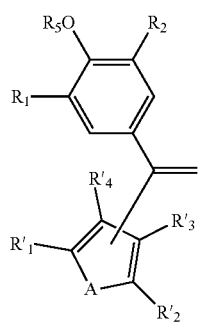

(IVk)

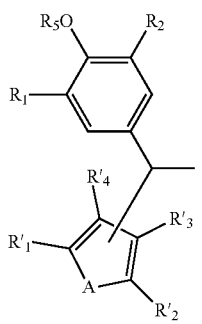

-continued

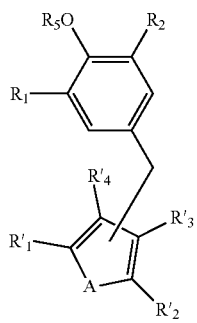

(IVl)

in which:

R₁ and R₂, identical or different, each represent a hydrogen atom, an —OMe methoxy group or a hydroxyl group, optionally protected by a hydroxyl-protecting group (as disclosed above, it is possible for the hydroxyl groups to have been set free, from the initial lignin molecule, by a demethylation treatment), R₅ represents a hydrogen atom or a hydroxyl-protecting group, A represents an oxygen atom, a sulfur atom or an —NR' group, wherein R' represents a hydrogen atom or a substituent not including any mesomeric-effect electron-withdrawing group conjugated to the aromatic ring, R₆ represents a hydrogen atom or a hydroxyl group, R'₁, R'₂, R'₃ and R'₄, identical or different, each represent a hydrogen atom or a substituent not including any mesomeric-effect electron-withdrawing group conjugated to the aromatic ring, one substituent among R'₁, R'₂, R'₃ and R'₄ representing the covalent bond with the benzylic carbon, for the depolymerisation products having the general formulas (IVa) and (IVb), A' represents a hydrogen atom, an —OH group, an —SH group or an —NHR' group, wherein R' represents a hydrogen atom or a substituent not including any mesomeric-effect electron-withdrawing group conjugated to the aromatic ring, or be one of the salts thereof.

For example, depolymerisation products that can be obtained according to the disclosure have the following formulas:

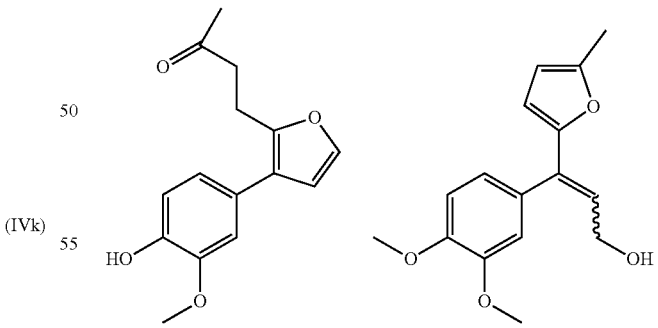

The depolymerisation products according to the disclosure have numerous uses, for example in the field of food contact materials.

BRIEF DESCRIPTION OF THE DRAWINGS

The features and advantages of the disclosure will be clearer in light of the exemplary aspects below, provided simply for illustrative purposes and in no way limiting to the disclosure, with the support of FIGS. 1 and 2, in which.

DETAILED DESCRIPTION

Figure 1:
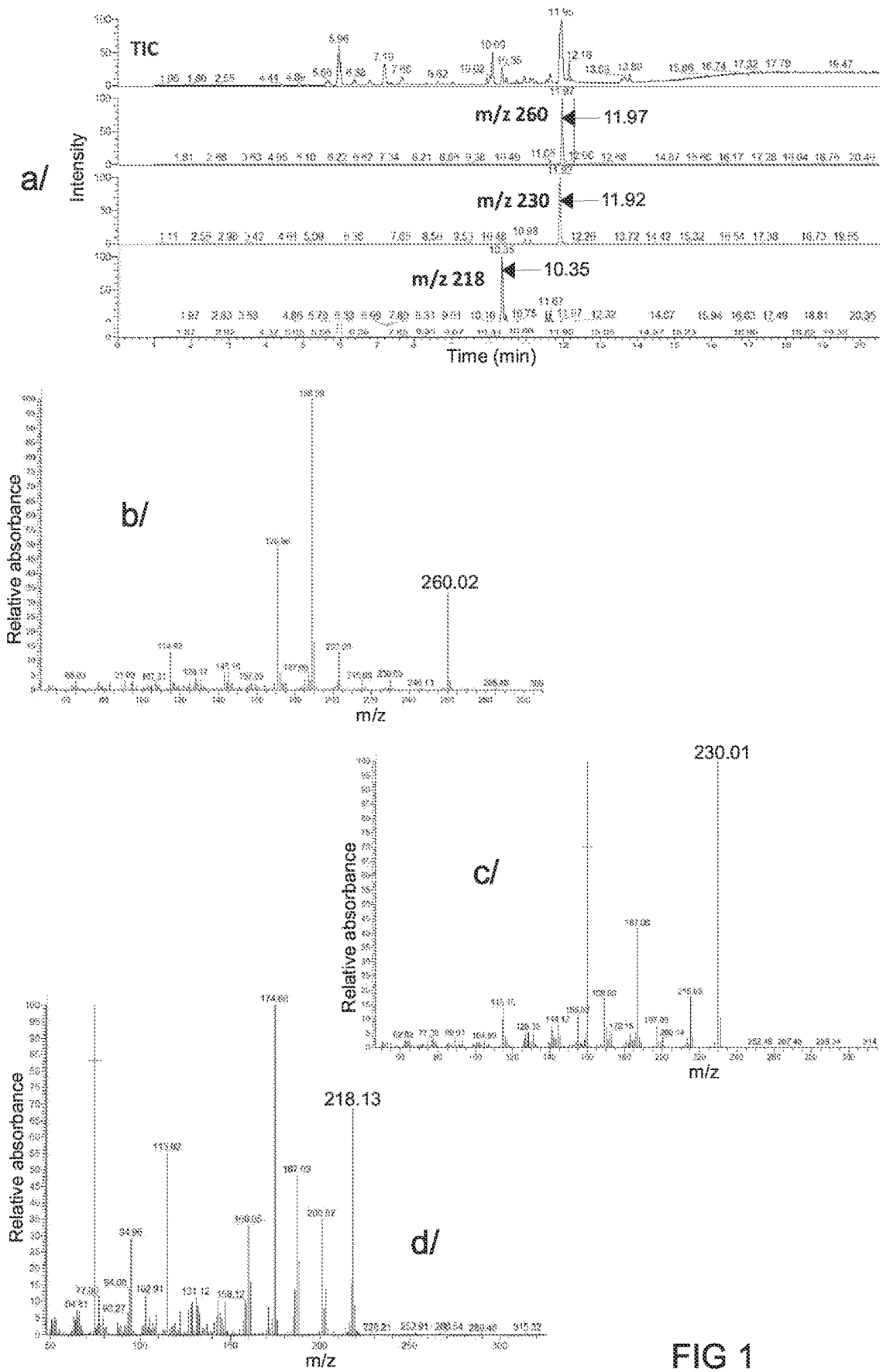
FIG. 1 shows spectra obtained by an analysis by Py-GC-MS coupling of a product of condensation of sylvane with 1-(4-hydroxy-3-methoxyphenyl)-2-(2-methoxyphenoxy) propane-1,3-diol, with in a/the chromatogram of the total ionic current (TIC) and the retention times of the peaks corresponding to the markers m/z 260, m/z 230 and m/z 218 extracted from the TIC; b/the mass spectrum of the peak at 11.97 min (marker m/z=260); c/the mass spectrum of the peak at 11.92 min (marker m/z=230); d/the mass spectrum of the peak at 10.35 min (marker m/z=218)

The condensation of metalloles of general formula (II) is carried out with simple lignin models: p-hydroxybenzyl alcohols such as gastrodigenin, vanillyl alcohol and syringyl alcohol, 1-(4-hydroxy-3-methoxyphenyl)-2-(2-methoxyphenoxy)propane-1,3-diol, and the p-alkoxybenzyl alcohols such as anisyl alcohol, veratryl alcohol, and 3,4,5-trimethoxybenzyl alcohol, 1-(3,4-dimethoxyphenyl)-2-(2-methoxyphenoxy)propane-1,3-diol, according to the present disclosure. The method according to the disclosure is also implemented on lignin extracts, or on lignocellulosic biomass.

The masses of the compounds obtained are verified by mass spectrometry with ES(+) electrospray probe after purification by preparative chromatography. The compounds obtained are also analysed by $^1H$ and $^{13}C$ NMR. The reaction yields are monitored by HPLC with detection at 280 nm.

The operating protocols implemented are the following.

Operating Protocols

Protocols for implementing methods for preparation of a lignin derivative according to the disclosure using lignin models

Operating Protocol A—Condensation of Para-Hydroxybenzyl Alcohols with the Metalloles The reaction mixture is prepared by solubilising the benzyl alcohol and the metallole (15 molar equivalents) in methanol to reach a final concentration of benzyl alcohol of 150 mmol.L$^{-1}$. This solution is acidified at 0.1 mol.L$^{-1}$ by fuming hydrochloric acid (37% aq.). The reaction is carried out for 120 min at 40° C.

The reaction medium is neutralised by the addition of an aqueous solution of sodium hydrogen carbonate, then the methanol and the excess metallole are evaporated under vacuum. The aqueous suspension is then extracted with diethyl ether, the organic fractions are combined, dried on sodium sulphate, and evaporated under vacuum.

The raw extract is purified by silica-gel chromatography by a 0→50% ethyl acetate/petroleum ether gradient.

Operating Protocol B—Condensation of Para-Methoxybenzyl Alcohols with the Metalloles The reaction mixture is prepared by solubilising the benzyl alcohol and the metallole (15 molar equivalents) in glyme to reach a final concentration of benzyl alcohol of 150 mmol.L$^{-1}$. This solution is acidified at 0.5 mol.L$^{-1}$ by anhydrous methanesulphonic acid. The reaction is carried out for 15 min at 60° C.

Water is added and the product is extracted with diethyl ether, the organic fractions are combined, dried on sodium sulphate, and evaporated under vacuum.

The raw extract is purified by silica-gel chromatography by a 0→50% ethyl acetate/petroleum ether gradient.

Protocols for Physical Pre-Treatment of the Material

Operating Protocol C—Grinding of the Biomass

The biomass (Douglas pine sawdust or corn stalks previously fragmented with a plant grinder) is placed in a cutting mill of the Retsch SM 100 type equipped with a 1 mm sieve. The Douglas pine sawdust is also ground with a finer 0.25 mm sieve.

Operating Protocol D—Fragmentation of the Douglas Pine Sawdust to Obtain a Wood Flour The average dimension of the sawdust particles ground with the 0.25 mm sieve is reduced to a micrometric dimension in a Retsch MM 400 mill, by setting the frequency to 20 Hz and the time to 10 min.

Protocols for Preparing the Lignin Extracts

Operating Protocol E—Extraction of the Lignins in Alkaline Conditions

The ground plant material (100 g) is placed in suspension in water (1 L). A soda solution (NaOH aq. 0.8% m/m) is added. The extraction is carried out at 70° C. for 2 h with stirring. The pH measured is from 12 to 13.

The extraction medium is cooled, filtered using a Büchner funnel and the solid residue washed with water (2×500 mL). The black liquor thus filtered is acidified by the addition of fuming hydrochloric acid until pH 2, and left this way until the lignins precipitate. The lignins in suspension are isolated and washed with water by centrifugation, then dried in an oven for 3 days at 40° C. and pulverised in a mill.

Operating Protocol F—Extraction of the Lignins in Acidic Conditions (Organosolv-Formacell)

The ground plant material (100 g) is placed in suspension in formic acid (400 mL), acetic acid (500 mL), fuming hydrochloric acid (2 mL). The extraction is carried out for 4 h at 90° C. The extraction medium is cooled, filtered using a Büchner funnel and the solid residue washed. To the solution thus filtered, 8 volume equivalents of water are added then the solution is left this way until the lignins precipitate. The lignins in suspension are isolated and washed with water by centrifugation, then dried in an oven for 3 days at 40° C. and pulverised in a mill.

Protocols for Implementing Methods for Preparing a Lignin Derivative According to the Invention from Biomass or Lignin Extract Operating Protocol A'—Functionalisation of Sawdust and Wood Flour or of Lignin Extracts with the Metalloles The sawdust, the wood flour or the lignin extract (48 mg) is suspended in a metallole/methanol 20% v/v mixture acidified with 0.1 mol.L$^{-1}$ of hydrochloric acid for a total volume of 3 mL. The suspension is stirred by sonication at 40° C. for 2 h. The suspension is neutralised by the addition of ammonium acetate and evaporated under vacuum. The solid obtained is directly analysed by pyrolysis and gas chromatography coupled with mass spectrometry (Py-GC-MS).

Operating Protocol H—Functionalisation without Addition of Catalyst (Acid) at High Temperature and High Pressure 20 g of the ground biomass are added to 200 mL of an EtOH/metallole/Water mixture (70/20/10 v/v %). The reaction medium is heated to 195° C. (22 bar) for 1 h. The reaction medium is cooled then filtered using a Büchner funnel. The solid residue is then washed by 4 volume equivalents of water. The lignin in suspension in the filtrate is isolated and washed with water by centrifugation, then dried in an oven for 3 days at 40° C. The solid obtained is directly analysed by Py-GC-MS.

Operating Protocol I—Analysis Via Py-GC-MS Coupling

A weighed quantity of sample is introduced into a quartz pyrolysis tube. The tube is disposed in the autosampler of a CDS 5250-T analytical pyrolysis system equipped with the trapping option (CDS Analytical, USA). The sample is pyrolyzed under a helium atmosphere in the pyrolysis chamber at 600° C. for 15 s, the compounds coming from the pyrolysis being trapped by adsorption on a trap made of Tenax-TA (trap) heated to 100° C. After desorption at 250° C. for 3 min, the volatile compounds are transferred into the injector of a GC Trace® Ultra gas chromatograph (Thermo Scientific, USA) via a transfer line heated to 280° C., at a constant flow rate of 1.2 mL/min. The injector is heated to 300° C. and set to a division ratio of 8. The volatile compounds are separated in a Phenomenex Zebron® ZB5-HT Inferno capillary column (30 m×0.25 mm×0.1 µm). The furnace is programmed to 100° C. for 3 min, then the temperature is increased up to 350° C. at 20° C./min, then maintained at this temperature for 5 min. The column is connected via a transfer line heated to 325° C. to a DSQ II simple quadrupole mass spectrometer (Thermo Scientific). The acquisition of the fragmentation spectra obtained by electronic ionisation at 70 eV is carried out in full scan mode over a range from 46 to 650 m/z.

Protocols of Methods for Cracking Lignin Derivatives According to the Invention

Operating Protocol J—Acidolysis (Acid-Catalysed Depolymerisation)

A solution containing the lignin derivative according to the disclosure at a final concentration of 10 g/L and methanesulphonic acid at 0.1 mol/L in methanol is stirred and reflux heated (65° C.) for 3 to 4 h. The formation of the product corresponding to the rupture of the β-O-4 bond is monitored by analysis via high-performance liquid chromatography/diode array detector/mass spectrometry coupling (UPLC-DAD-MS). An equivalent volume of water is added to the reaction medium and the methanol is evaporated under vacuum. The aqueous solution is extracted 3 times by 1 equivalent volume of diethyl ether. The organic phases are combined, dried on sodium sulphate, filtered on glass wool and dry evaporated under vacuum. The raw product is purified by low-pressure chromatography.

Operating Protocol K—Alkanolysis (Base-Catalysed Depolymerisation)

A methanol solution containing the lignin derivative according to the disclosure at a final concentration of 10 g/L and 1 M NaOH is stirred and heated to 100° C. in a hermetically sealed threaded SVL tube for 7 to 8 h. The formation of the product corresponding to the rupture of the β-O-4 bond is monitored by analysis via UPLC-DAD-MS coupling. An equivalent volume of water is added to the reaction medium and the methanol is evaporated under vacuum. The aqueous solution is extracted 3 times by 1 equivalent volume of diethyl ether. The organic phases are combined, dried on sodium sulphate, filtered on glass wool and dry evaporated under vacuum. The raw product is purified by low-pressure chromatography.

Operating Protocol L—Pyrolysis (Thermochemical Depolymerisation)

A mass of a lignin extract (containing or not containing a lignin derivative according to the disclosure) is placed in a quartz boat, itself placed in a rotary-kiln reactor to carry out the pyrolysis experiments. Before each experimental trial, the reactor is purged with nitrogen for 30 min to ensure an environment without oxygen. Then, the experiments are carried out at 500° C., by applying a heating speed of approximately 20° C./min. The residence time at the maximum temperature was 10 min at atmospheric pressure, under an inert atmosphere.

EXAMPLES

Example 1—Sylvanylation of Gastrodigenin

The sylvanylation, that is to say the reaction with the sylvane having the general formula (IIa):

(IIa)

in which, with respect to the general formula (II) above, A represents an oxygen atom, R'$_2$ represents a methyl group and R'$_1$, R'$_3$ and R'$_4$ represent atoms of hydrogen, is carried out according to operating protocol A, on 1.86 g of gastrodigenin, having the general formula:

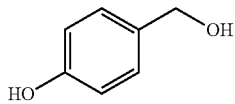

The sylvanylated derivative having the following general formula is obtained:

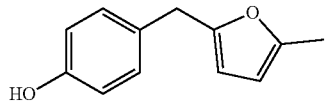

in which the hydroxyl group borne by the benzylic carbon has been substituted by the sylvane.

This derivative is in the form of a dark yellow oil.

The yield of the reaction is greater than 95%. After purification by preparative chromatography, 1.12 g of compound are obtained.

NMR $^1$H δ: 7.13 (2H, Ar); 6.78 (2H, Ar); 5.87 (1H, Ar); 5.86 (1H, m); 3.86 (2H, s); 2.26 (3H, s)

NMR $^{13}$C δ: 154.0; 153.1; 150.9; 130.6; 129.8; 115.3; 106.6; 105.9; 33.6; 13.5

Mass spectrometry: (2M+H)/z=377 Th

Example 2—Sylvanylation of Vanillyl Alcohol

Operating protocol A is applied to the sylvanylation of vanillyl alcohol, having the general formula:

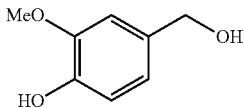

The sylvanylated derivative having the following general formula is obtained:

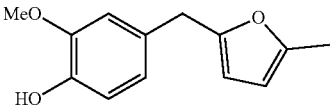

in which the hydroxyl group borne by the benzylic carbon has been substituted by the sylvane.

This derivative is in the form of a brown oil.

The yield of the reaction is 94%. After purification by preparative chromatography, 1.98 g of compound are obtained from initial 2 g of vanillyl alcohol.

NMR $^1$H δ: 6.82 (1H, Ar); 6.72 (2H, Ar); 5.83 (2H, bs); 3.85 (3H, s); 3.82 (2H, s); 2.23 (3H, s)

NMR $^{13}$C δ: 153.1; 150.9; 146.6; 144.2; 130.3; 121.4; 114.4; 111.4; 106.6; 106.0; 55.9; 34.2; 13.4

Mass spectrometry: (M+H)/z=219 Th (fragment: 137 Th); (2M+H)/z=437 Th

Example 3—Sylvanylation of Syringic Alcohol

Operating protocol A is applied to the sylvanylation of syringic alcohol.

The sylvanylated derivative having the following general formula is obtained:

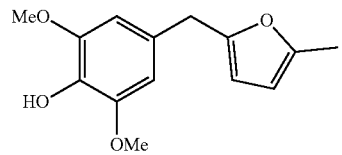

in which the hydroxyl group borne by the benzylic carbon has been substituted by the sylvane.

This derivative is in the form of an orange oil.

The yield of the reaction is 93%. After purification by preparative chromatography, 1.28 g of compound are obtained from initial 1.80 g of alcohol.

NMR $^1$H δ: 6.48 (2H, Ar); 5.87 (2H, m); 3.87 (6H, s); 3.84 (2H, s); 2.26 (3H, s)

NMR $^{13}$C δ: 152.9; 151.0; 146.9; 133.2; 129.4; 106.8; 106.0; 105.4; 56.2; 34.6; 13.5

Mass spectrometry: (M+H)/z=249 Th; (M+Na)/z=271 Th; (2M+H)/z=497 Th; (2M+Na)/z=519

Example 4—Sylvanylation of Anisic Alcohol

Operating protocol B is applied to the sylvanylation of anisic alcohol.

The sylvanylated derivative having the following general formula is obtained:

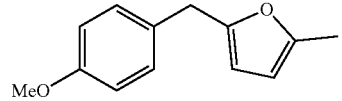

in which the hydroxyl group borne by the benzylic carbon has been substituted by the sylvane.

This derivative is in the form of a dark yellow oil.

The yield of the reaction is 99%. After purification by preparative chromatography, 1.94 g of compound are obtained from initial 2.07 g of alcohol.

NMR $^1$H δ: 7.17 (2H, Ar); 6.86 (2H, Ar); 5.85 (2H, m); 3.87 (2H, s); 3.80 (3H, s); 2.26 (3H, s)

NMR $^{13}$C δ: 158.2 153.2; 150.9; 130.5; 129.6; 113.8; 106.6; 105.9; 55.2; 34.7; 13.5

Mass spectrometry: (2M+H)/z=405 Th

Example 5—Sylvanylation of Veratric Alcohol

Operating protocol B is applied to the sylvanylation of veratric alcohol, having the general formula:

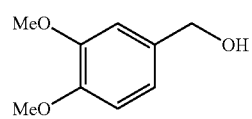

The sylvanylated derivative having the following general formula is obtained:

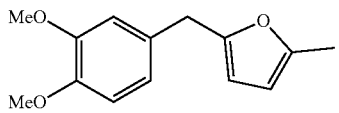

in which the hydroxyl group borne by the benzylic carbon has been substituted by the sylvane.

This derivative is in the form of a yellow oil.

The yield of the reaction is 97%. After purification by preparative chromatography, 2.21 g of compound are obtained from initial 2.53 g of veratric alcohol.

NMR $^1$H δ: 6.83 (1H, Ar); 6.81 (2H, Ar); 5.88 (2H, bs); 3.88 (6H, s); 3.88 (3H, s); 2.28 (3H, s)

NMR $^{13}$C δ: 153.0; 150.9; 148.8; 147.6; 131.0; 120.6; 112.0; 111.2; 106.7; 105.9; 55.9; 55.8; 34.1; 13.5

Mass spectrometry: (M+H)/z=233 Th (fragment: 151 Th); (2M+Na)/z=487 Th

Example 6—Sylvanylation of 3,4,5-trimethoxybenzyl Alcohol

Operating protocol B is applied to the sylvanylation of 3,4,5-trimethoxybenzyl alcohol.

The sylvanylated derivative having the following general formula is obtained:

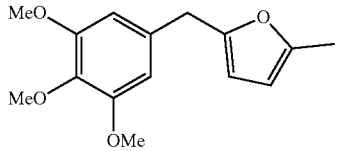

in which the hydroxyl group borne by the benzylic carbon has been substituted by the sylvane.

This derivative is in the form of a dark yellow oil.

The yield of the reaction is 92%. After purification by preparative chromatography, 1.76 g of compound are obtained from initial 2.00 g of alcohol.

NMR $^1$H δ: 6.47 (2H, Ar); 5.89 (2H, m); 3.86 (2H, s); 3.84 (9H, s); 3.84 (3H, s); 2.26 (3H, s)

NMR $^{13}$C δ: 153.1; 152.4; 151.0; 136.5; 134.0; 106.9; 106.0; 105.7; 60.7; 56.0; 34.7; 13.4

Mass spectrometry: (M+H)/z=263 Th; (2M+Na)/z=547 Th

Example 7—Condensation of N-methylpyrrole with Vanillyl Alcohol

Operating protocol A is applied to the condensation of N-methylpyrrole with vanillyl alcohol.

The derivative having the following general formula is obtained:

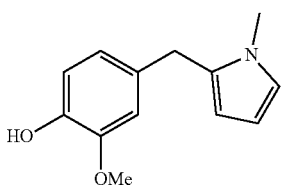

in which the hydroxyl group borne by the benzylic carbon has been substituted by the N-methylpyrrole.

This derivative is in the form of a red oil.

The yield of the reaction is 87%. After purification by preparative chromatography, 0.874 g of compound are obtained from initial 1.00 g of alcohol.

NMR $^1$H δ: 6.78 (4H, Ar); 6.12 (1H, m); 5.94 (1H, d, J=3.3 Hz); 3.92 (2H, s); 3.87 (3H, s); 3.48 (3H, s)

NMR $^{13}$C δ: 146.5; 143.9; 131.7; 131.2; 121.7; 121.1; 114.2; 111.0; 107.7; 106.5; 55.8; 35.9; 32.2

Mass spectrometry: (M+H)/z=218 Th (fragment: 137 Th); (M+Na)/z=250 Th

Example 8—Condensation of N-methylpyrrole with Veratric Alcohol

Operating protocol B is applied to the condensation of N-methylpyrrole with veratric alcohol.

The derivative having the following general formula is obtained:

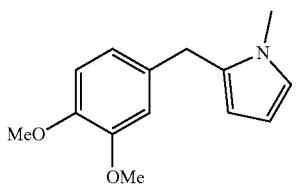

in which the hydroxyl group borne by the benzylic carbon has been substituted by the N-methylpyrrole.

This derivative is in the form of a yellow oil.

The yield of the reaction is 94%. After purification by preparative chromatography, 0.786 g of compound are obtained from initial 1.00 g of alcohol.

NMR $^1$H δ: 6.76 (4H, Ar); 6.08 (1H, d, J=3.3 Hz); 5.90 (1H, d, J=3.3 Hz); 3.90 (2H, s); 3.87 (6H, s); 3.46 (3H, s)

NMR $^{13}$C δ: 150.0; 147.5; 132.0; 131.6; 121.7; 120.4; 111.8; 111.3; 107.7; 106.5; 55.1; 55.8; 36.0; 32.4

Mass spectrometry: (M+H)/z=232 Th (fragment: 151 Th); (2M+Na)/z=485 Th

Example 9—Condensation of 2-ethylthiophene with Veratric Alcohol

Operating protocol B is applied to the condensation of 2-ethylthiophene with veratric alcohol.

The derivative having the following general formula is obtained:

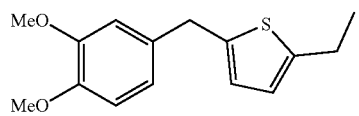

in which the hydroxyl group borne by the benzylic carbon has been substituted by the 2-ethylthiophene.

This derivative is in the form of an orange-brown oil.

The yield of the reaction is 95%. After purification by preparative chromatography, 0.71 g of compound are obtained from initial 1.00 g of alcohol.

NMR $^1$H δ: 6.72 (5H, Ar); 4.05 (2H, s); 3.88 (6H, s); 2.80 (2H, q, J=3.4 Hz); 1.29 (3H, t, J=7.5 Hz)

NMR $^{13}$C δ: 148.9; 147.6; 146.0; 141.7; 133.1; 124.3; 122.7; 120.5; 111.2; 55.8; 35.9; 23.4; 15.8

Mass spectrometry: (M+H)/z=263 Th (fragment 151 Th); (M+Na)/z=285 Th; (2M+H)/z=547 Th Example 10—Sylvanylation of 1-(3,4-dimethoxyphenyl)-2-(2-methoxyphenoxy)propane-1,3-diol Operating protocol B is applied to the condensation of sylvane with 1-(3,4-dimethoxyphenyl)-2-(2-methoxyphenoxy)propane-1,3-diol.

The derivative having the following general formula is obtained:

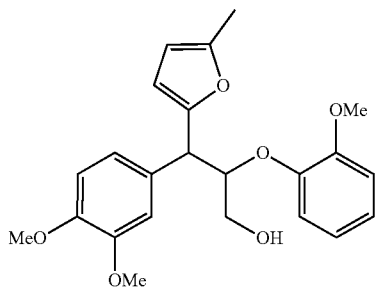

in which the hydroxyl group borne by the benzylic carbon has been substituted by the sylvane.

This derivative is in the form of a slightly yellowish viscous oil.

The yield of the reaction is 99%. After purification by preparative chromatography, 184 mg of compound are obtained from initial 200 mg of alcohol.

NMR $^1$H δ: 6.92 (7H, Ar); 6.09 (1H, Ar); 5.88 (1H, m); 4.61 (1H, m); 4.42 (1H, m) 3.85 (9H, m); 3.53 (2H, m); 2.26 (3H, m)

NMR $^{13}$C δ: 153.1; 150.7; 149.0; 148.1; 147.6; 131.9; 123.7; 121.5; 120.7; 112.1; 111.9; 111.4; 107.6; 106.3; 86.1; 61.4; 55.9; 46.6; 13.6

Mass spectrometry: (M+H)/z=399 Th; (M+NH$_4$)/z=416 Th; (2M+H)/z=797 Th; (2M+Na)/z=819Th Example 11—Condensation of N-methylpyrrole with 1-(3,4-dimethoxyphenyl)-2-(2-methoxyphenoxy)propane-1,3-diol Operating protocol B is applied to the condensation of N-methylpyrrole with 1-(3,4-dimethoxyphenyl)-2-(2-methoxyphenoxy)propane-1,3-diol.

The derivative having the following general formula is obtained:

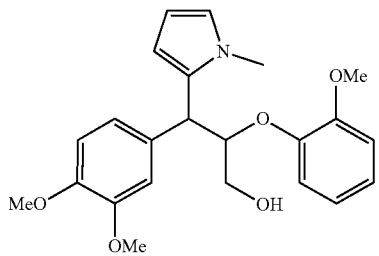

in which the hydroxyl group borne by the benzylic carbon has been substituted by the N-methylpyrrole.

This derivative is in the form of a slightly yellowish viscous oil.

The yield of the reaction is 97%. After purification by preparative chromatography, 122 mg of compound are obtained from initial 200 mg of alcohol.

NMR $^1$H δ: 6.80 (8H, Ar); 6.32 (1H, m) 6.08 (1H, m); 4.44 (2H, m); 3.84 (9H, m); 3.71 (2H, m); 3.50 (3H, m)

NMR $^{13}$C δ: 151.3; 148.8; 148.0; 147.7; 133.5; 132.2; 123.5; 121.6; 121.5; 121.2; 120.3; 112.5; 112.0; 111.3; 106.8; 106.2; 87.5; 62.5; 55.9; 44.1; 33.9

Mass spectrometry: (M+H)/z=398 Th; (M+Na)/z=420 Th

Example 12—Condensation of 2-ethylthiophene with 1-(3,4-dimethoxyphenyl)-2-(2-methoxyphenoxy)propane-1,3-diol Operating protocol B is applied, in 180 min, to the condensation of 2-ethylthiophene with 1-(3,4-dimethoxyphenyl)-2-(2-methoxyphenoxy)propane-1,3-diol.

The derivative having the following general formula is obtained:

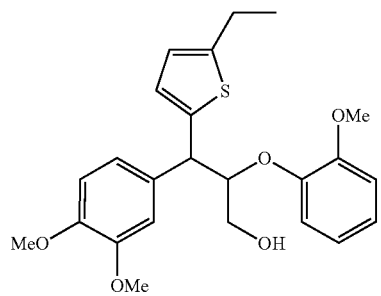

in which the hydroxyl group borne by the benzylic carbon has been substituted by the 2-ethylthiophene.

This derivative is in the form of a slightly yellowish viscous oil.

The yield of the reaction is 59%. After purification by preparative chromatography, 278 mg of compound are obtained from initial 400 mg of alcohol.

NMR $^1$H δ: 6.84 (9H, Ar); 4.57 (2H, m); 3.86 (9H, m); 3.57 (2H, m); 2.78 (2H, q, J=7.9 Hz); 1.27 (3H, m)

NMR $^{13}$C δ: 151.6; 149.0; 147.5; 146.1; 134.3; 133.4; 125.4; 123.8; 122.6; 121.6; 120.7; 112.2; 111.4; 87.4; 61.5; 55.9; 48.3; 23.4; 15.9

Mass spectrometry: (M+NH$_4$)/z=446 Th; (2M+H)/z=857 Th; (2M+NH$_4$)/z=874 Th

Example 13—Condensation of N-methylpyrrole with 1-(4-hydroxy-3-methoxyphenyl)-2-(2-methoxyphenoxy)propane-1,3-diol Operating protocol B is applied to the condensation of N-methylpyrrole with 1-(4-hydroxy-3-methoxyphenyl)-2-(2-methoxyphenoxy)propane-1,3-diol.

The derivative having the following general formula is obtained:

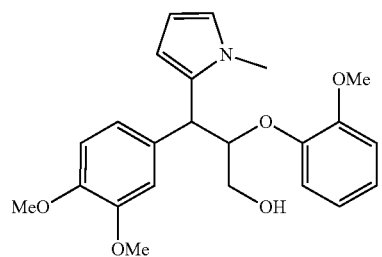

in which the hydroxyl group borne by the benzylic carbon has been substituted by the N-methylpyrrole.

This derivative is in the form of a slightly yellowish viscous oil.

The yield of the reaction is 98%. After purification by preparative chromatography, 306 mg of compound are obtained from initial 400 mg of alcohol.

NMR $^1$H δ: 6.78 (8H, Ar); 6.08 (2H, m); 4.49 (2H, m); 3.84 (6H, m); 3.65 (2H, m); 3.43 (3H, m)

NMR $^{13}$C δ: 151.3; 148.0; 146.4; 144.5; 132.8; 131.6; 123.4; 121.8; 121.6; 121.5; 120.2; 114.4; 114.1; 111.9; 106.7; 106.5; 87.4; 62.5; 55.9; 44.1; 33.9

Mass spectrometry: (M+H)/z=384 Th (fragment 303 Th); (M+Na)/z=406 Th; (2M+NH$_4$)/z=784 Th; (2M+Na)/z=789 Th Example 14—Condensation of Sylvane with 1-(4-hydroxy-3-methoxyphenyl)-2-(2-methoxyphenoxy)propane-1,3-diol Operating protocol B is applied to the condensation of sylvane with 1-(4-hydroxy-3-methoxyphenyl)-2-(2-methoxyphenoxy)propane-1,3-diol.

The derivative having the following general formula is obtained:

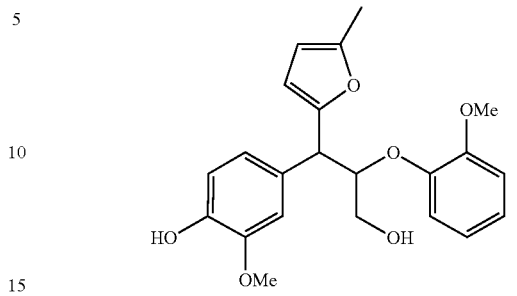

in which the hydroxyl group borne by the benzylic carbon has been substituted by the sylvane.

This derivative is in the form of a slightly yellowish viscous oil.

The yield of the reaction is 99%. After purification by preparative chromatography, 480 mg of compound are obtained from initial 400 mg of alcohol.

NMR $^1$H δ: 6.93 (7H, Ar); 6.08 (1H, Ar); 5.88 (1H, m); 4.60 (1H, m); 4.42 (1H, m) 3.85 (6H, m); 3.54 (2H, m); 2.25 (3H, m)

NMR $^{13}$C δ: 153.2; 150.7; 147.6; 146.5; 144.7; 131.2; 123.7; 121.5; 120.7; 114.5; 112.1; 111.3; 107.6; 106.2; 86.1; 61.4; 55.9; 46.6; 13.6

Mass spectrometry: (M+H)/z=385 Th; (M+NH$_4$)/z=402 Th; (2M+H)/z=769 Th; (2M+NH$_4$)/z=784 Th Example 15—Simultaneous Implementation of the Extraction of Lignin from Douglas Pine Sawdust by a Method of the Organosolv Type and of a Method for Preparing A Lignin Derivative According to the Disclosure The sawdust having a particle size of 1 mm is placed in a batch reactor with an EtOH/sylvane/Water solution (70/20/10 v/v %) under the conditions of Protocol H. The reactor is placed under a nitrogen atmosphere. The solution is stirred and brought to 195° C., giving a working pressure of 22 bar. The heating is maintained for 1 h. The lignin extract conjugated to the metallole is recovered after filtration, precipitation and centrifugation. The precipitate is dried in an oven at 40° C. The dry lignin extract is analysed by Pyrolysis-GC-MS coupling, according to Protocol I.

Example 16—Characterisation of the Lignin Derivatives According to the Disclosure by Py-GC-MS Coupling (Protocol I)

The characteristic signals of the functionalisation of lignin by metalloles (m/z, these signals being designated hereinafter by the term "markers") are sought on the basis of the results obtained by Py-GC-MS, according to Protocol I (ionisation by electron impact mode), for the derivatives of model dimers described in Example 14 for sylvane and in Example 12 for 2-ethylthiophene.

The spectra obtained for the sylvanylated derivative of Example 14 are shown in FIG. 1. The markers m/z=260, m/z=230 and m/z=218, specific to the functionalisation of the lignin model by sylvane, are identified therein.

These markers correspond to the following pyrolysis products:
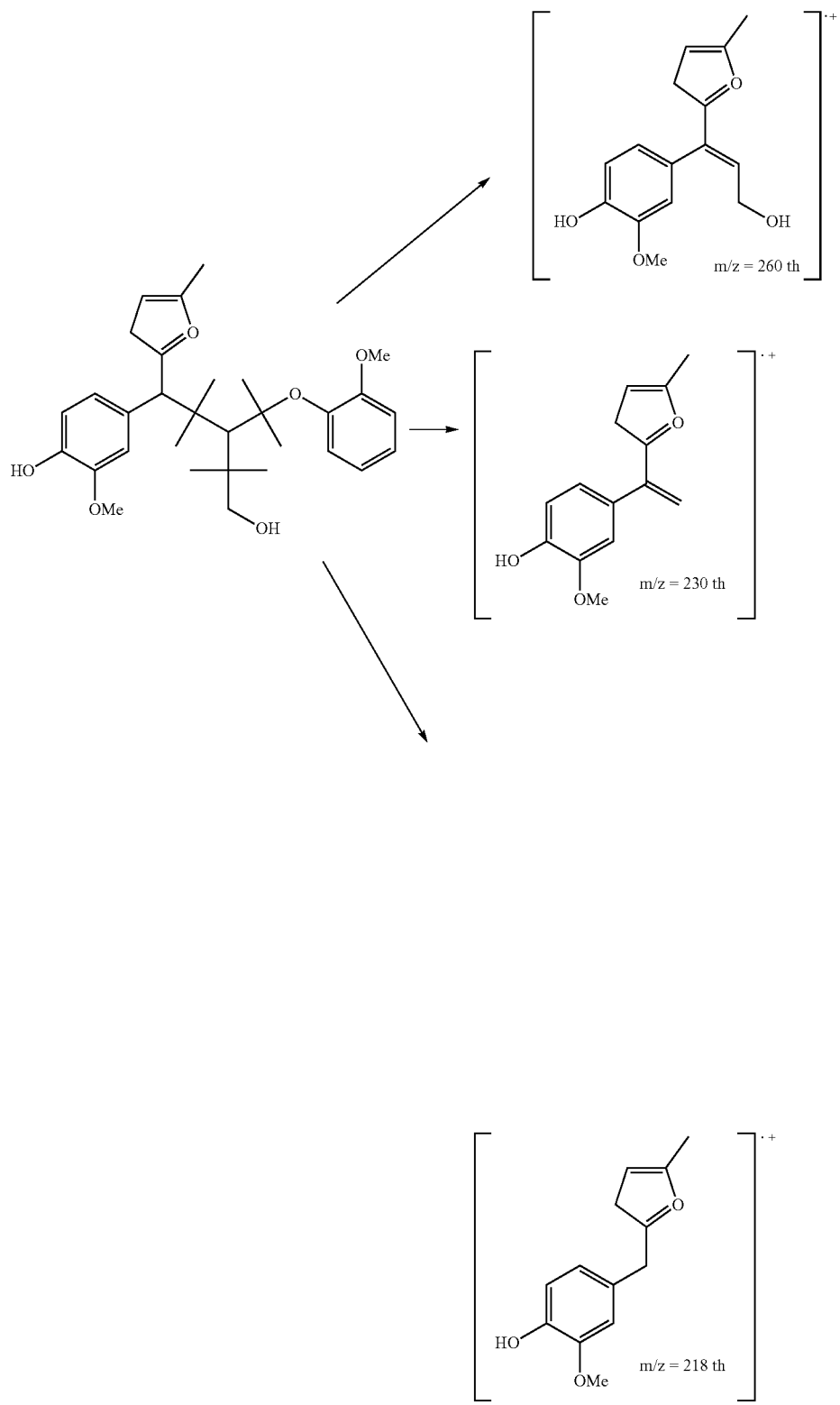

A signal m/z=124 corresponding to the guaiacol fragment (not shown in the figures) is also observed.

Figure 2:
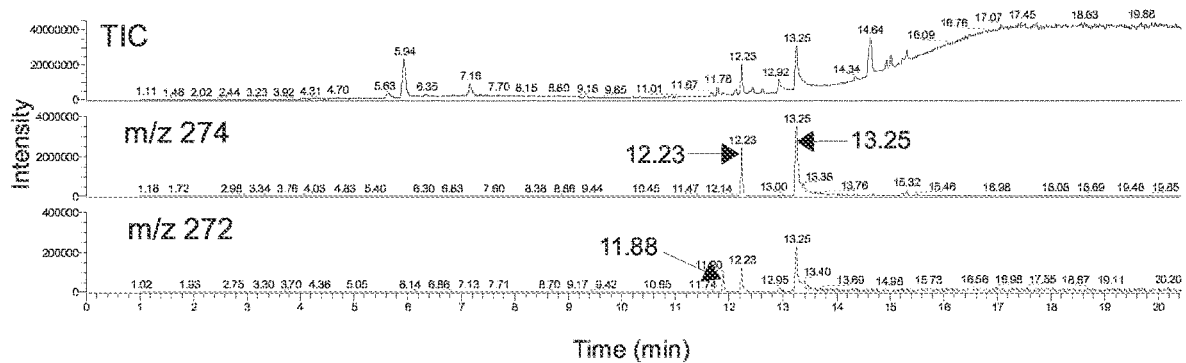
FIG. 2 shows the spectra obtained by an analysis by Py-GC-MS coupling of a product of condensation of 2-ethylthiophene with 1-(3,4-dimethoxyphenyl)-2-(2-methoxyphenoxy)propane-1,3-diol, with in a/the chromatogram of the total ionic current (TIC) and the retention times of the peaks corresponding to the markers m/z 274 and m/z 276 extracted from the TIC; b/the mass spectrum of the peak at 13.25 min (marker m/z=274); c/the mass spectrum of the peak at 12.23 min (marker m/z=274); d/the mass spectrum of the peak at 11.88 min (marker m/z=276).
Figure 2:
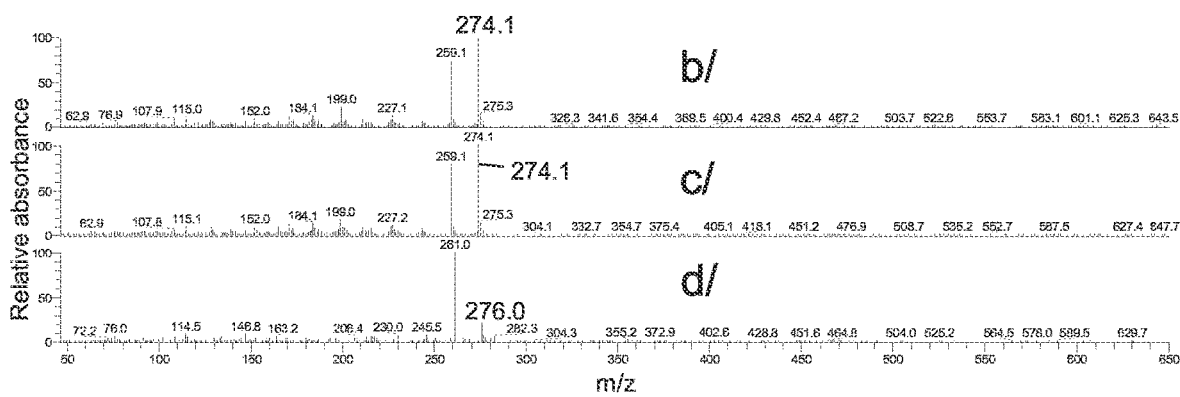

The spectra obtained for the derivative of Example 12 (functionalisation by 2-ethylthiophene) are shown in FIG. 2. The markers m/z=274 and m/z=276, specific to the functionalisation of this lignin model by this metallole, are identified therein.

These markers correspond to the following pyrolysis products:

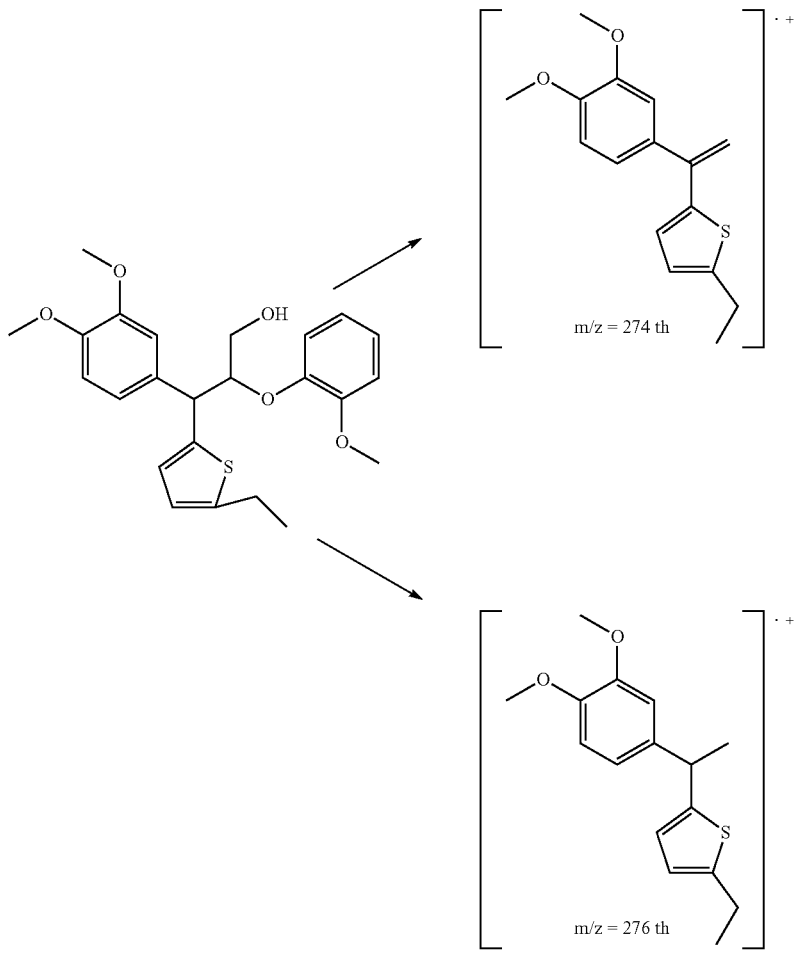

Various lignin extracts, either commercial, or prepared from Douglas pine sawdust or corn stalks ground according to the Protocols E or F, are stabilised by condensation with a metallole (sylvane or 2-ethylthiophene) in accordance with the present disclosure according to Protocol A'. The products obtained are neutralised by addition of an equimolar quantity of base and concentrated to dryness under vacuum.

Moreover, the condensation with the sylvane is directly carried out on samples of biomass (sawdust and wood flour) according to Protocol A' or according to Protocol H.

Each of the products obtained is analysed by Py-GC-MS coupling to verify the presence of the signals characteristic of the functionalisation by the metallole (markers). The markers sought are the markers m/z=260, 230 and 218 for the sylvanylated derivatives, and m/z=260, 262 for the derivatives obtained with the 2-ethylthiophene.

As regards the derivatives obtained with 2-ethylthiophene, the difference of m/z 14 with the characteristic signals obtained as described above with the model dimer are due to the absence of the second —CH$_3$ group on the phenolic ring in the lignin with respect to this model dimer. The pyrolysis products obtained for the lignin derivative, and the associated markers, are indeed the following:

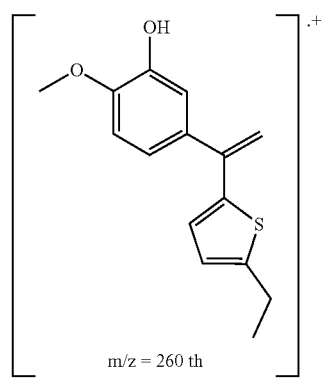

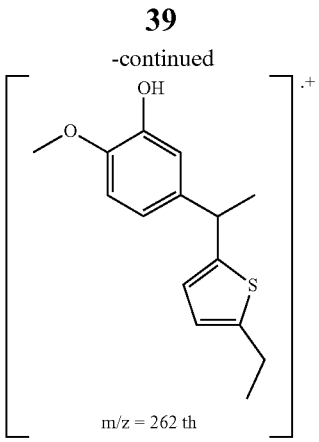

$m/z = 262$ th

It is previously verified, by Py-GC-MS analysis, that all of these signals do not appear for the extracts of wood lignin and corn lignin not functionalised by a metallole.

The nature of the substrates on which methods according to the disclosure are implemented, the protocols used and the results of the Py-GC-MS analysis are shown in Table 1 below.

TABLE 1

Results of analysis by Py-GC-MS coupling for lignin derivatives obtained according to the disclosure

| Lignin | Method for obtaining | Functionalisation method | m/z markers detected by Py-GC-MS |
|---|---|---|---|
| Extract of wood lignin | Protocol E (alkaline) | Protocol A' - sylvane | 260-230-218 |
| Extract of corn lignin | Protocol E (alkaline) | Protocol A' - sylvane | 260-230-218 |
| Kraft lignin | Commercial extract | Protocol A' - sylvane | 260-230-218 |
| Extract of wood lignin | Protocol F (Formacell) | Protocol A' - sylvane | 260-230-218 |
| Ground sawdust (0.25 mm) | Protocol C | Protocol A' - sylvane | 260-230-218 |
| Wood flour | Protocol D | Protocol A' - sylvane | 260-230-218 |
| Ground sawdust (1 mm) | Protocol C | Protocol H (single reactor) - nitrogen - sylvane | 260-230-218 |
| Ground sawdust (1 mm) | Protocol C | Protocol H (single reactor) - air - sylvane | 260-230-218 |
| Extract of wood lignin | Protocol E (alkaline) | Protocol A' - 2-ethylthiophene | 260-262 |
| Extract of corn lignin | Protocol E (alkaline) | Protocol A' - 2-ethylthiophene | 260-262 |
| Kraft lignin | Commercial extract | Protocol A' - 2-ethylthiophene | 260-262 |

These results confirm the success of the functionalisation of the lignin by the metallole, carried out according to the present disclosure, regardless of the form of the starting lignin, including when the functionalisation is carried out directly on the biomass, and even in a single reactor with a conventional method for extraction of lignin, and regardless of the metallole used.

Example 17—Acid-Catalysed Depolymerisation of the Sylvanylated Derivative Obtained in Example 14 According to Protocol J 200 mg of the sylvanylated product described in Example 14 are dissolved in 20 mL of methanol containing 0.1 M of methanesulphonic acid. The solution is brought to 65° C. with stirring for 3 h. 25 mL of water are added to the reaction mixture and the methanol is evaporated under vacuum. The raw product obtained at the end of the method is purified by silica-gel chromatography by a 0 to 2% Methanol/dichloromethane gradient. The derivative having the following general formula is obtained:

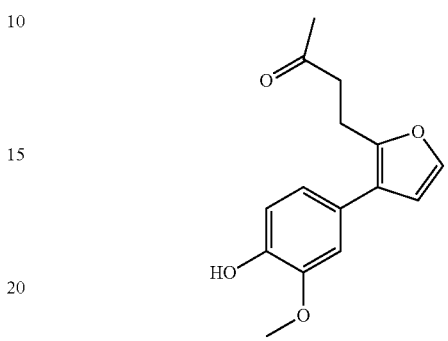

NMR $^1$H δ: 7.34 (1H, Ar); 6.92 (3H, Ar); 6.46 (1H, Ar); 5.69 (H, bs); 3.84 (3H, s); 3.08 (2H, t, J=7.48 Hz); 2.85 (2H, t, J=7.48 Hz); 2.17 (3H, s)

NMR $^{13}$C δ: 207.7; 149.1; 146.6; 144.5; 140.6; 126.0; 121.3; 120.9; 114.6; 111.6; 110.6; 56.0; 41.5; 30.0; 21.1

Mass spectrometry: (M+H)/z=261 Th; (M+Na)/z=283 Th; (2M+Na)/z=543 Th

This derivative can be converted by reflux heating of the methanol under oxidising conditions into its unsaturated form having the following general formula:

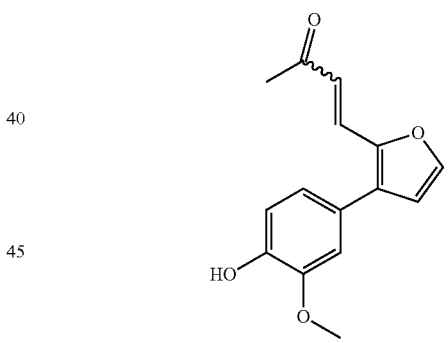

Mass spectrometry: (M+H)/z=259 Th; (M+Na)/z=281 Th; (2M+Na)/z=539 Th λmax of the UV-visible spectrum: 360 nm Example 18—Base-Catalysed Depolymerisation of the Sylvanylated Derivative Obtained in Example 10 According to Protocol K 200 mg of the sylvanylated product described in Example 10 are placed in a threaded SVL tube and 20 mL of methanol containing 1 M of sodium hydroxide are added. The solution is brought to 100° C. with stirring for 7 h. 25 mL of water are added to the reaction mixture and the methanol is evaporated under vacuum. The raw product obtained at the end of the method is purified by silica-gel chromatography by a 0 to 2% Methanol/dichloromethane gradient. The derivative having the following general formula is obtained:

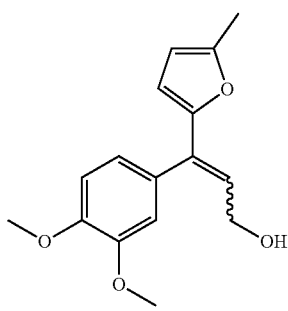

NMR ¹H δ: 6.90 (3H, Ar); 6.19 (1H, Ar); 6.15 (1H, Ar); 5.75 (1H, t, J=5.96 Hz); 4.35 (2H, J=5.96 Hz); 3.72 (6H, bs); 2.26 (3H, s)

NMR ¹³C δ: 153.8; 151.6; 150.2; 149.5; 148.1; 132.7; 130.5; 120.0; 112.4; 112.1; 111.3; 107.1; 55.8; 55.2; 13.2

Mass spectrometry: (M−H₂O)/z=257 Th; (M+Na)/z=297 Th; (2M+Na)/z=571 Th

Example 19—Heat-Catalysed Depolymerisation of the Sylvanylated Derivative Obtained in Example 16

A small quantity of alkaline extract of sylvanylated wood lignin obtained in Example 16 is pyrolyzed at 500° C. under the conditions of Protocol L. The oil condensed and recovered at the end of the pyrolysis is analysed by GC-MS coupling.

The presence of the characteristic markers of the products of pyrolysis of the lignin derivative functionalised by the sylvane according to the disclosure, that is to say the peaks at m/z 260, m/z 230 and m/z 218, are detected.

What is claimed is:

1. A lignin derivative comprising a unit having the general formula (I):

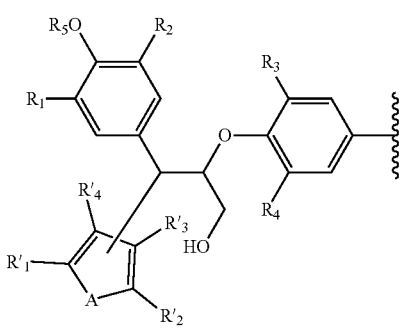

in which:
R₁, R₂, R₃ and R₄, which may identical or different, each represent a hydrogen atom, an —OMe methoxy group, a hydroxyl group, optionally protected by a hydroxyl-protecting group, or a

motif,
R₅ represents a hydrogen atom, a hydroxyl-protecting group or a

motif,
A represents a sulfur atom or an —NR' group, where R' represents a hydrogen atom or a substituent not including any mesomeric-effect electron-withdrawing group conjugated to the aromatic ring,
R'₁, R'₂, R'₃ and R'₄, which may be identical or different, each represent a hydrogen atom or a substituent not including any mesomeric-effect electron-withdrawing group conjugated to the aromatic ring,
one substituent among R'₁, R'₂, R'₃ and R'4 representing the covalent bond with the benzylic carbon,
or one of the salts thereof.

2. The lignin derivative according to claim 1, wherein R'₁ and R'2, identical or different, each represent, except for the substituent forming the covalent bond with the benzylic carbon:
a hydrogen atom,
or a linear, branched and/or cyclic, saturated and/or unsaturated, optionally aromatic, carbon radical, which may include a single cycle or a plurality of condensed cycles, optionally substituted, optionally including one or more heteroatoms and/or one or more groups comprising one or more heteroatoms.

3. The lignin derivative according to claim 1, wherein R'₃ and R'₄, identical or different, each represent, except for the substituent forming the covalent bond with the benzylic carbon:
a hydrogen atom,
a group including an electron-donating radical bonded directly or by conjugation to the aromatic ring,
or a linear, branched and/or cyclic, saturated and/or unsaturated, optionally aromatic, carbon radical, which may include a single cycle or a plurality of condensed cycles, optionally substituted, optionally including one or more heteroatoms and/or one or more groups comprising one or more heteroatoms.

4. The lignin derivative according to claim 1, wherein at least one substituent among R'₁, R'₂, R'₃ and R'₄ represents a hydrogen atom.

5. The lignin derivative according to claim 1, wherein R'₁ represents the covalent bond with the benzylic carbon.

6. The lignin derivative according to claim 1, wherein R'₃ and R'₄ each represent a hydrogen atom.

7. The lignin derivative according to claim 1, wherein R'₂ represents a hydrogen atom or an alkyl group.

8. The lignin derivative according to claim 1, wherein A represents an —NR' group, wherein R' represents a hydrogen atom or a C1-C4 alkyl radical, R'₁ represents the covalent bond with the benzylic carbon, and R'₂, R'₃ and R'₄ each represent a hydrogen atom.

9. A method for preparing a lignin derivative as claimed in claim 1, wherein lignin is reacted with a compound having the general formula (II):

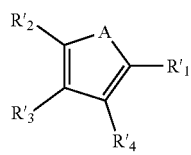

(II)

in which

A represents a sulfur atom or an —NR' group, wherein R' represents a hydrogen atom or a substituent not including any mesomeric-effect electron-withdrawing group conjugated to the aromatic ring, $R'_1$, $R'_2$, $R'_3$ and $R'_4$, which may be identical or different, each represent a hydrogen atom or a substituent not including any mesomeric-effect electron-withdrawing group conjugated to the aromatic ring, at least one substituent among $R'_1$, $R'_2$, $R'_3$ and $R'_4$ representing a hydrogen atom, or one of the salts thereof, so as to realize the substitution of a hydroxyl group of the lignin, in particular of a group borne by a benzylic carbon, by said compound having the general formula (II).

10. The method according to claim 9, wherein the compound having the general formula (II) is introduced into the reaction medium in a quantity such that the number of molar equivalents of the compound having the general formula (II) with respect to the number of benzylic carbons of the lignin is between 2 and 15.

11. The method according to claim 9, wherein the reaction between the lignin and the compound having the general formula (II) is carried out in an acidic medium.

12. The method according to claim 9, wherein the reaction between the lignin and the compound having the general formula (II) is carried out in an organic solvent, alone or in a mixture with water.

13. The method according to claim 9, implemented on lignocellulosic biomass.

14. The method according to claim 9, implemented on lignin extracted from lignocellulosic biomass.

15. The method according to claim 9, implemented simultaneously to a method for extraction of lignin from lignocellulosic biomass.

16. A method for depolymerisation of lignin, comprising the two successive steps of:

implementing a method for preparing a lignin derivative according to claim 9, and cracking of the lignin derivative thus obtained.

17. The method according to claim 16, wherein said two steps are carried out successively in the same reactor.

18. A depolymerisation product obtainable by a method for depolymerisation of lignin according to claim 16.

* * * * *